United States Patent
Sengupta et al.

(10) Patent No.: US 12,418,443 B2
(45) Date of Patent: Sep. 16, 2025

(54) DEMODULATION REFERENCE SIGNAL TRANSMISSION FROM MULTIPLE BASE STATIONS

(71) Applicant: Apple Inc., Cupertino, CA (US)

(72) Inventors: Avik Sengupta, San Jose, CA (US);
Bishwarup Mondal, Santa Ramon, CA (US); Alexei Davydov, Nizhny Novgorod (RU); Sameer Pawar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 17/280,461

(22) PCT Filed: Sep. 26, 2019

(86) PCT No.: PCT/US2019/053178
§ 371 (c)(1),
(2) Date: Mar. 26, 2021

(87) PCT Pub. No.: WO2020/069147
PCT Pub. Date: Apr. 2, 2020

(65) Prior Publication Data
US 2022/0116247 A1   Apr. 14, 2022

Related U.S. Application Data

(60) Provisional application No. 62/739,052, filed on Sep. 28, 2018.

(51) Int. Cl.
*H04L 25/02* (2006.01)
*H04B 7/0413* (2017.01)
(Continued)

(52) U.S. Cl.
CPC ....... *H04L 25/0228* (2013.01); *H04B 7/0851* (2013.01); *H04L 5/0035* (2013.01);
(Continued)

(58) Field of Classification Search
CPC . H04L 25/0228; H04L 5/0035; H04L 5/0051; H04L 5/0094; H04B 7/0851; H04B 7/0413
(Continued)

(56) References Cited

U.S. PATENT DOCUMENTS

| | | |
|---|---|---|
| 10,560,229 B2 | 2/2020 | Xiong et al. |
| 2014/0092827 A1 | 4/2014 | Jongren et al. |

(Continued)

FOREIGN PATENT DOCUMENTS

| | | |
|---|---|---|
| CN | 107637000 A | 1/2018 |
| WO | WO 2018/045307 A1 | 3/2018 |

(Continued)

OTHER PUBLICATIONS

International Search Report and Written Opinion of the International Searching Authority directed to related International Patent Application No. PCT/US2019/053178, mailed Jan. 16, 2020, 10 pages.

(Continued)

*Primary Examiner* — Xuan Lu
(74) *Attorney, Agent, or Firm* — Sterne, Kessler, Goldstein & Fox P.L.L.C.

(57) ABSTRACT

Systems, apparatuses, methods, and computer-readable media are provided for user equipment (UE) idle mode operations. In embodiments, a UE wakes up more than once during a Discontinuous Reception (DRX) cycle. Inter-frequency measurement requirements may be relaxed based on DRX cycle length. Some embodiments include radiofrequency (RF) circuitry warm-up overhead reduction by on-duration separation with RF circuitry switching pattern adaption. Some embodiments include and RF circuitry warm-up overhead reduction by adaptive synchronization (Continued)

signal block (SSB) reference symbol down-selection. Other embodiments may be described and/or claimed.

20 Claims, 7 Drawing Sheets

(51) Int. Cl.
  H04B 7/08 (2006.01)
  H04L 5/00 (2006.01)
(52) U.S. Cl.
  CPC .......... H04L 5/0051 (2013.01); H04L 5/0094 (2013.01); H04B 7/0413 (2013.01)
(58) Field of Classification Search
  USPC ........................................................ 370/252
  See application file for complete search history.

(56) References Cited

U.S. PATENT DOCUMENTS

| 2015/0249973 | A1 | 9/2015 | Park et al. | |
| 2019/0320469 | A1* | 10/2019 | Huang | H04W 72/23 |
| 2020/0077369 | A1* | 3/2020 | Zhang | H04L 5/0053 |
| 2020/0213057 | A1* | 7/2020 | Bala | H04L 5/0023 |
| 2020/0296747 | A1* | 9/2020 | Kim | H04L 5/0044 |
| 2020/0336355 | A1* | 10/2020 | Yamada | H04B 17/318 |
| 2020/0383091 | A1* | 12/2020 | Park | H04W 72/042 |
| 2021/0175937 | A1* | 6/2021 | Yamada | H04W 16/28 |
| 2021/0328734 | A1* | 10/2021 | Noh | H04L 5/005 |
| 2021/0337548 | A1* | 10/2021 | Gao | H04L 5/0051 |

FOREIGN PATENT DOCUMENTS

| WO | WO 2018/053009 A1 | 3/2018 |
| WO | WO 2018-083253 | 5/2018 |

OTHER PUBLICATIONS

Huawei et al., "Design of DL DMRS for Data Transmission", R1-1704233, 3GPP TSG RAN WG1 Meeting #88bis, Spokane, USA, Mar. 25, 2017.
Panasonic, "PT-RS Design", R1-1717779, 3GPP TSG RAN WG1 Meeting #90bis, Prague, Czechia, Oct. 3, 2017.
English language translation of Office Action for Chinese Patent Application No. 201980063998.0, dated Mar. 16, 2024, 14 pages.
3rd Generation Partnership Project; Technical Specification Group Radio Access Network; NR; Physical layer procedures for data (Release 15) 3GPP TS 38.214 V15.2.0 (Jun. 2018); 94 pages.
3rd Generation Partnership Project; Technical Specification Group Radio Access Network; NR; Physical channels and modulation (Release 15) 33GPP TS 38.211 v15.30 (Sep. 2018); 96 pages.
3rd Generation Partnership Project; Technical Specification Group Radio Access Network; NR; Multiplexing and channel coding (Release 15) 3GPP TS 38.212 V15.3.0 (Sep. 2018); 99 pages.
3rd Generation Partnership Project; Technical Specification Group Radio Access Network; NR; Medium Access Control (MAC) protocol specification (Release 15) 3GPP TS 38.321 V15.3.0 (Sep. 2018); 76 pages.
3rd Generation Partnership Project; Technical Specification Group Radio Access Network; NR; User Equipment (UE) radio access capabilities (Release 15) 3GPP TS 38.306 V15.2.0 (Jun. 2018); 26 pages.

* cited by examiner

DEMODULATION REFERENCE SIGNAL TRANSMISSION FROM MULTIPLE BASE STATIONS

RELATED APPLICATIONS

The present application is a U.S. National Phase of International Application No. PCT/US2019/053178, filed Sep. 26, 2019, which claims priority to U.S. Provisional Patent Application No. 62/739,052, filed Sep. 28, 2018, the entire disclosures of which are hereby incorporated by reference in their entireties.

FIELD

Various embodiments of the present application generally relate to the field of wireless communications, and in particular, to Multi-Transmission/Reception Point (TRP) and/or Coordinated Multi-Point communication.

BACKGROUND

New Radio (NR) Demodulation Reference Signal (DM-RS) is a user-specific reference signal, which can be used for channel estimation for downlink shared channel (PDSCH) and uplink shared channel (PUSCH) data demodulation. DMRS is used by the receiver (e.g., UE 101 or RAN node 111) to estimate the radio channel for demodulation of a corresponding physical channel. In Rel-15 NR, DM-RS is generated using a length 31 Gold Sequence. There are two different DM-RS configurations namely, configuration Type 1 and Type 2. Type 1 DM-RS has 2 code-division multiplexed (CDM) port groups with each group occupying 6 orthogonal frequency resource elements (REs) within a physical resource block (PRB) on a single OFDM symbol. Type 1 single symbol DM-RS can support a maximum of 4 orthogonal DM-RS ports with 2 DM-RS ports multiplexed within each CDM-group using frequency domain orthogonal cover codes (FD-OCC). Type 2 DM-RS has 3 CDM port groups with each group occupying 4 orthogonal REs within a PRB on a single OFDM symbol. Type 2 single symbol DM-RS can support a maximum of 6 orthogonal DMRS ports with each CDM-group having 2 DM-RS ports multiplexed using FD-OCC. Furthermore, both Type 1 and Type 2 DM-RS can occupy two OFDM symbols with ports multiplexed using time-domain (TD) OCC in addition to FD-OCC. Two-symbol Type 1 DM-RS can support a maximum of 8 ports with 4 ports in each CDM-Group. Two-symbol Type 2 DM-RS can support a maximum of 12 orthogonal ports with 4 ports in each CDM-Group.

DETAILED DESCRIPTION

Embodiments discussed herein provide techniques for transmission and reception of Demodulation Reference Signals (DMRS) from multiple Transmission/Reception Points (TRPs). The multiple TRPs transmitting/receiving DMRS may be connected by ideal or non-ideal backhaul links with varying degrees of inter-TRP coordination. In some embodiments, DMRS ports can be sub-divided into DMRS port groups which can correspond to single or multiple TRPs. The embodiments herein include DMRS transmission (Tx) and reception (Rx) techniques based on single Downlink Control Information (DCI) or multiple DCI configuration for multiple TRPs. Other embodiments may be described and/or claimed.

Figure 1:
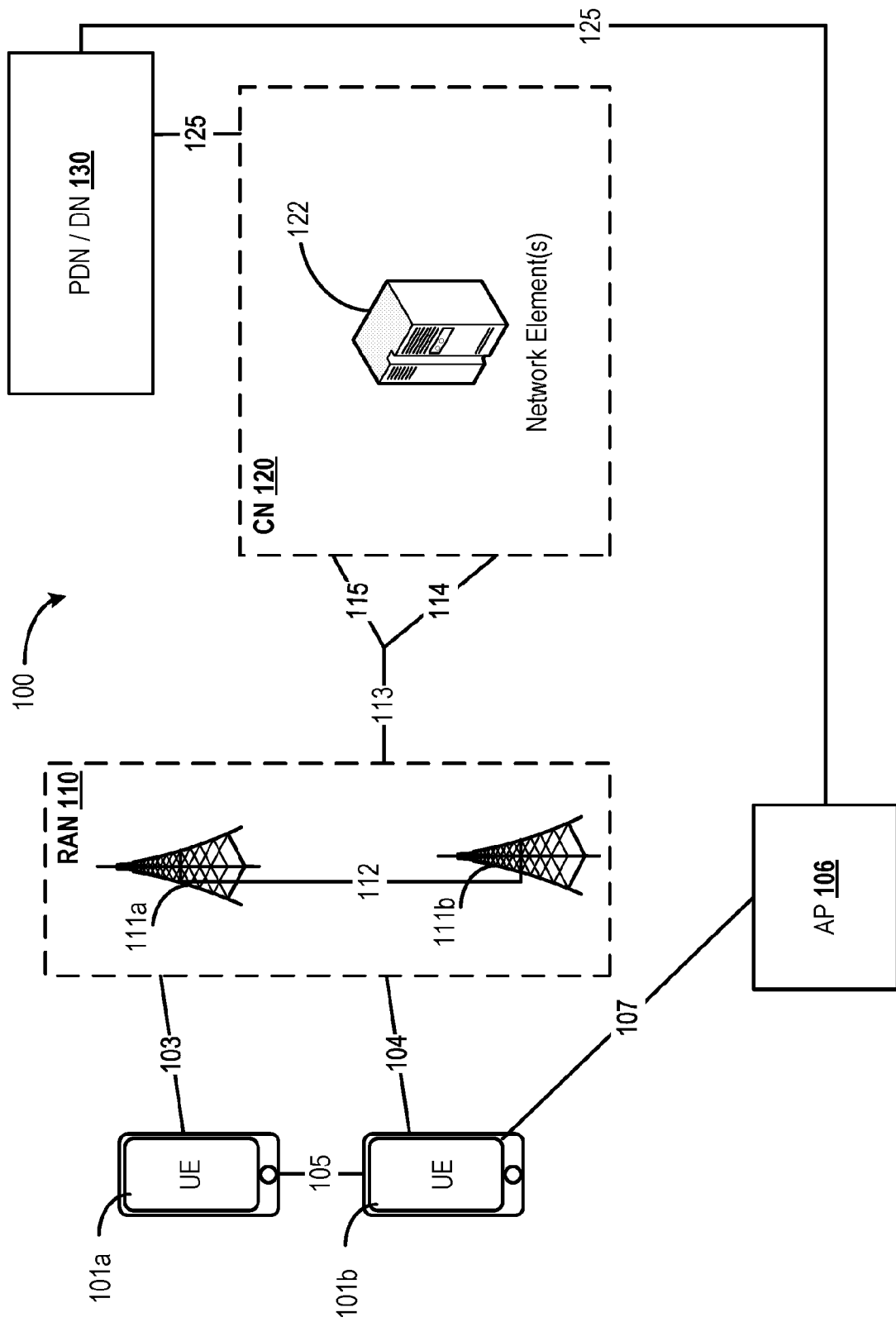
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the Fifth Generation (5G) or New Radio (NR) system standards or Long Term Evolution (LTE) system standards as provided by the Third Generation Partnership Project (3GPP) technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., Wireless Metropolitan Area Network (WMAN), Worldwide Interoperability for Microwave Access (WiMAX), etc.), or the like.

As shown by FIG. 1, the system 100 includes user equipment (UE) 101a and UE 101b (collectively referred to as "UEs 101" or "UE 101"). A UE 101 is any device with radio communication capabilities, such as a wireless communications interface, and describes a remote user of network resources in a communications network. In this example, UEs 101 are illustrated as smartphones, but may also comprise any mobile or non-mobile computing device, such as consumer tablet computers, wearable devices, desktop computers, laptop computers, in-vehicle infotainment (IVI) devices, head-up display (HUD) devices, Internet of Things (IoT) devices, embedded systems or microcontrollers, networked or "smart" appliances, and/or the like. The UEs 101 include various hardware elements such as baseband circuitry, memory circuitry, radiofrequency (RF) circuitry, and interface circuitry (e.g., input/output (I/O) interfaces), some or all of which may be coupled with one another via a suitable interconnect (IX) technology. The RF circuitry includes various hardware elements (e.g., switches, filters, amplifiers, digital signal processors (DSPs), etc.) configured to enable communication with wireless networks using modulated electromagnetic radiation through a non-solid medium. The electronic elements may be arranged as receive signal path (or receiving (Rx) RF chain) to down-convert received RF signals and provide baseband signals to the baseband circuitry, and arranged as a transmit signal path to up-convert baseband signals provided by the baseband circuitry and provide RF output signals to an antenna array via a front-end module for transmission. The baseband circuitry and RF circuitry allow the UEs 101 to connect or communicatively couple with a Radio Access Network (RAN) 110. In various embodiments, the UEs 101 may have multiple panels or multiple antenna arrays, and are configured to receive multiple independently scheduled data streams from different TRPs 111 in a multiple-DCI based multi-TRP/panel transmission. These aspects are discussed in more detail infra.

The UE 101b is shown to be configured to access an access point (AP) 106 via connection 107. The connection 107 can comprise a local wireless area network (WLAN) connection consistent with any IEEE 802.11 protocol, wherein the AP 106 may be a WiFi® router, gateway appliance, or the like. In this example, the AP 106 is shown to be connected to the Internet without connecting to the core network of the wireless system (described in further detail below). In various embodiments, the UE 101*b*, RAN 110, and AP 106 may be configured to utilize LTE-WLAN aggregation (LWA) operation and/or LTE/WLAN Radio Level Integration with IPsec Tunnel (LWIP) operation.

The RAN 110 is a set of RAN nodes 111 that implement a Radio Access Technology (RAT); the term "RAT" as used herein refers to a type of technology used for radio access such as NR, E-UTRA, WiFi/WLAN, and/or the like. The set of RAN nodes 111 in the RAN 110 are connected to one another via interface 112 and connected to the CN 120 through interface 113. In embodiments, the RAN 110 may be a Universal Terrestrial Radio Access Network (UTRAN) or Groupe Spécial Mobile (GSM)/Enhanced Datarates for GSM (EDGE) RAN (GERAN) when system 100 is an UTRAN or GERAN system, an Evolved UTRAN (E-UTRAN) when system 100 is an LTE or 4G system, or a next generation (NG) RAN or a 5G RAN when system 100 is an NR/5G system. The UEs 101 utilize connections (or channels) 103 and 104, respectively, each of which comprises a physical communications interface or layer. The term "channel" or "link" as used herein refers to any transmission medium, either tangible or intangible, which is used to communicate data or a data stream. Additionally, the term "link" as used herein refers to a connection between two devices through a RAT for the purpose of transmitting and receiving information. In FIG. 1, the connections 103 and 104 are illustrated as an air interface to enable communicative coupling, and can be consistent with cellular communications protocols, such as GSM, Code-Division Multiple Access (CDMA), Push-to-Talk (PTT) and/or PPT over cellular (POC), UMTS, LTE, 5G/NR, and/or the like. The UEs 101 may also directly exchange data via a Proximity Services (ProSe) or sidelink (SL) interface 105 comprising one or more physical and/or logical SL channels.

The RAN 110 includes one or more RAN nodes 111*a* and 111*b* (collectively referred to as "RAN nodes 111" or "RAN node 111") that enable the connections 103 and 104. The RAN nodes 111 are infrastructure equipment that provide the radio baseband functions for data and/or voice connectivity between a network (e.g., core network (CN) 120) and one or more users (e.g., UEs 101). The RAN nodes 111 can be referred to as NodeBs 111 in UMTS systems, evolved NodeBs (eNBs) 111 in LTE systems, next generation NodeBs (gNBs) 111 or next generation eNBs (ng-eNBs) in 5G/NR systems, Road Side Units (RSUs) for vehicle-to-everything (V2X) implementations, and so forth. In some embodiments, each RAN node 111 may be a Transmission/Reception Point (TRP). In other embodiments, each RAN node 111 may have multiple antenna elements, where each antenna element may be an individual TRP.

The RAN nodes 111 can comprise ground stations (e.g., terrestrial access points) or satellite stations providing coverage within a geographic area (e.g., a cell). The RAN nodes 111 may be implemented as one or more dedicated physical devices such as a macrocell base stations, and/or a low power base stations for providing femtocells, picocells, or other like cells having smaller coverage areas, smaller user capacity, or higher bandwidth compared to macrocells. Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some embodiments, all or parts of the RAN nodes 111 may be implemented as one or more software entities running on server computers as part of a virtual network (e.g., a cloud RAN (CRAN), virtual baseband unit pool (vBBUP), or the like). In these embodiments, the RAN nodes 111 may implement a RAN function split where different protocol entities are operated by different elements. The term "element" as used herein refers to a unit that is indivisible at a given level of abstraction and has a clearly defined boundary. One or more RAN nodes 111 may represent individual distributed units (DUs) that are connected to centralized unit (CU) via respective F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as a CRAN/vBBUP.

The RAN nodes 111 may be configured to communicate with one another via interface 112. The interface 112 may include a user plane interface for carrying user plane data between the RAN nodes 111, and a control plane interface for carrying control signaling between the RAN nodes 111. The interface 112 may be an X2 interface 112 when the system 100 is an LTE system, and the interface 112 may be an Xn interface 112 when the system 100 is a 5G/NR system. In some embodiments, interface 112 may be a wireless backhaul connection.

According to various embodiments, the RAN nodes 111 support single DCI based multi-TRP transmission and/or multi-DCI based multi-TRP transmission schemes. Single DCI based multi-TRP transmission involves one of the TRPs transmitting a DCI over a corresponding PDCCH which schedules the PDSCH to be transmitted by/from some or all the TRPs, and each PDSCH is sent from an individual TRPs. Multi-DCI based multi-TRP transmission involves multiple DCIs being transmitted over a corresponding PDCCH to schedule respective PDSCHs, and each PDSCH is sent from an individual TRP. Multi-DCI based multi-TRP transmission may be used when TRPs/RAN nodes 111 are interconnected by a non-ideal backhaul since joint scheduling may not be feasible due to the delay of data/CSI exchange among the TRPs. In these embodiments, the UE 101 is capable of receiving multiple independently scheduled data streams from different TRPs in multiple-DCI based multi-TRP/panel transmission.

In embodiments, the UEs 101 can be configured to communicate using Orthogonal Frequency Division Multiplexing (OFDM) communication signals with each other or with any of the RAN nodes 111 over a multicarrier communication channel in accordance with various communication techniques, such as, but not limited to, an OFDMA communication technique (e.g., for DL communications) or a Single Carrier Frequency Division Multiple Access (SC-FDMA) communication technique (e.g., for UL and ProSe/SL communications), although the scope of the embodiments is not limited in this respect. The OFDM signals can comprise a plurality of orthogonal subcarriers.

DL and UL transmissions may be organized into frames with 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. There is one resource grid for a given antenna port p, subcarrier spacing (SCS) configuration µ, and transmission direction (DL or UL). The frequency location of a subcarrier refers to the center frequency of that subcarrier. Each element in the resource grid for antenna port p and SCS configuration µ is called a resource element (RE) and is uniquely identified by $(k,l)_{p,\mu}$ where k is the index in the frequency domain (e.g., k is a subcarrier index relative to a reference or reference point) and l refers to the symbol position in the time domain relative to some reference point (e.g., l is an OFDM symbol index relative to a reference or reference point). RE $(k,l)_{p,\mu}$ corresponds to a physical resource and the complex value $a_{k,l}^{(p,\mu)}$. In other words, $a_{k,l}^{(p,\mu)}$ is the value of RE (k,l) for antenna port p and SCS configuration µ. A collection of REs make up a resource block (RB), which is usually defined as $N_{sc}^{RB}=12$ consecutive subcarriers in the frequency domain.

An antenna port is defined such that the channel over which a symbol on the antenna port is conveyed can be inferred from the channel over which another symbol on the same antenna port is conveyed. Two antenna ports are said to be quasi co-located (QCLed) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same Precoding RB Group (PRG) as described in clause 5.1.2.3 of 3GPP TS 38.214 v15.2.0 (2018-06). For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used as described in clause 7.3.2.2 of 38.211 v15.3.0 (2018-09). For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index according to clause 7.4.3.1 as described in clause 7.3.2.2 of 38.211 v15.3.0 (2018-09).

A bandwidth part (BWP) is a subset of contiguous common RBs for a given numerology $\mu_i$ in BWP i on a given carrier. The UE 101 can be configured with up to four BWPs in the DL with a single downlink BWP being active at a given time. The UE 101 is not expected to receive PDSCH, PDCCH, or CSI-RS (except for RRM) outside an active BWP. The UE 101 can be configured with up to four BWPs in the UL with a single UL BWP being active at a given time. The UE 101 does not transmit PUSCH or PUCCH outside an active BWP. For an active cell, the UE 101 does not transmit SRS outside an active BWP.

There are several different physical channels and physical signals that are conveyed using RBs, Physical RBs (PRBs), and/or individual REs. A physical channel corresponds to a set of REs carrying information originating from higher layers. Physical channels include physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers. Physical signals include physical UL signals (e.g., Demodulation Reference Signal (DMRS or DM-RS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.).

The PDSCH carries user data and higher-layer signaling to the UEs 101, and the PDCCH carries DL resource assignment information for receiving the PDSCH. Each UE 101 monitors a set of PDCCH candidates on one or more activated serving cells as configured by higher layer signaling for control information (e.g., Downlink Control Information (DCI)), where monitoring implies attempting to decode a set of PDCCH candidates according one or more monitored DCI formats (e.g., DCI formats 0 through 6-2 as discussed in section 5.3.3 of 3GPP TS 38.212 v15.3.0 (2018-09) (hereinafter "TS 38.212 v15.3.0"), DCI formats 0_0 through 2_3 as discussed in section 7.3 of TS 38.212 v15.3.0, or the like). The DCI includes, inter alia, DL assignments and/or UL scheduling grants including, for example, modulation and coding format, resource allocation, and HARQ information, among other information/commands. Each UE 101 monitors (or attempts to decode) respective sets of PDCCH candidates in one or more configured monitoring occasions according to UE or cell-specific search spaces (for LTE/4G), or monitors (or attempts to decode) respective sets of PDCCH candidates in one or more configured monitoring occasions in one or more configured Control Resource Sets (CORESETs) according to corresponding search space configurations (for NR/5G). A CORESET includes a set of PRBs with a time duration of 1 to 3 OFDM symbols. The REGs and CCEs are defined within a CORESET with each CCE including a set of REGs. Interleaved and non-interleaved CCE-to-REG mapping are supported in a CORESET. Each REG carrying PDCCH carries its own DMRS.

PDSCH transmissions are scheduled by DCI format 1_0 and DCI format 1_1. DCI format 1_0 is used for the scheduling of PDSCH in one DL cell and DCI format 1_1 is used for the scheduling of PDSCH in one cell. DCI format 1_0 includes, inter alia, a frequency domain resource assignment, a time domain resource assignment, and other fields/elements as discussed in TS 38.212 v15.3.0. DCI format 1_1 includes, inter alia, a bandwidth part indicator, a frequency domain resource assignment, a time domain resource assignment, antenna port(s) where the number of CDM groups without data of values 1, 2, and 3 refers to CDM groups {0}, {0,1}, and {0, 1, 2} respectively and the antenna ports $\{p_0, \ldots, p_{0-1}\}$ are determined according to the ordering of DMRS port(s) given by Tables 7.3.1.2.2-1/2/3/4 of TS 38.212 v15.3.0, and other fields/elements as discussed in TS 38.212 v15.3.0.

The RAN 110 is shown to be communicatively coupled to a core network (CN) 120 comprising one or more network elements 122, which are configured to offer various data and telecommunications services to customers/subscribers (e.g., users of UEs 101) who are connected to the CN 120 via the RAN 110. The term "network element" as used herein refers to physical or virtualized equipment and/or infrastructure used to provide wired or wireless communication network services, and may be considered synonymous with, and/or referred to as, a networked computer, networking hardware, network equipment, network node, router, switch, hub, bridge, radio network controller (RNC), RAN device, RAN node, gateway, server, cloud node, Virtualized Network Function (VNF), NFV Infrastructure (NFVI), and/or the like. The network elements 122 may be one or more server computer systems, which may implement various CN elements (e.g., network functions (NFs) and/or application functions (AFs)) such as those discussed herein. The components of the CN 120 may be implemented in one physical node or separate physical nodes including components to read and execute instructions from a machine-readable or computer-readable medium (e.g., a non-transitory machine-readable storage medium). In some embodiments, Network Function Virtualization (NFV) may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. As used herein, the terms "instantiate," "instantiation," and the like refers to the creation of an instance, and an "instance" refers to a concrete occurrence of an object, which may occur, for example, during execution of program code. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more NFs/AFs.

In embodiments where the CN 120 is an Evolved Packet Core (EPC) in LTE systems, the one or more network elements 122 may include or operate one or more Mobility Management Entities (MMEs), Serving Gateways (S-GWs), PDN Gateways (P-GWs), Home Subscriber Servers (HSSs), Policy Control and Charging Rules Functions (PCRFs), and/or other like LTE CN elements. In these embodiments, the E-UTRAN 110 may be connected with the EPC 120 via an S1 interface 113. In these embodiments, the S1 interface 113 is split into two parts: an S1-U interface 114 to carry traffic data between the RAN nodes 111 and the S-GW, and the S1-MME interface 115, which is a signaling interface between the RAN nodes 111 and MMEs. Additionally, the P-GW within the EPC 120 may route data packets between the EPC 120 and external networks such as a network including a Packet Data Network (PDN) 130 via an Internet Protocol (IP) interface 125. The PDN 130 may be an operator external public, a private PDN (e.g., enterprise network, cloud computing service, etc.), or an intra-operator PDN (e.g., for provision of IMS and/or IP-CAN services).

In embodiments where the CN 120 is a 5GC 120, the network elements 122 may implement one or more instances of an Authentication Server Function (AUSF), Access and Mobility Management Function (AMF), Session Management Function (SMF), Network Exposure Function (NEF), Policy Control Function (PCF), NF Repository Function (NRF), Unified Data Management (UDM) entity, AF, User Plane Function (UPF), Short Message Service Function (SMSF), Non-3GPP Interworking Function (N3IWF), Network Slice Selection Function (NSSF), and/or other like NR NFs. In such embodiments, the NG-RAN 110 may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a data network (DN) 130 via an IP interface 125. The DN 130 may represent one or more DNs including one or more Local Area DNs (LADNs), and may be an operator external public, a private PDN, an intra-operator PDN as discussed previously.

The CN 120 is shown to be communicatively coupled to PDN/DN 130 via an IP communications interface 125. The PDN/DN 130 may include one or more application servers (AS). The application server(s) (and the network element(s) 122) comprise one or more physical and/or virtualized systems for providing functionality (or services) to one or more clients (e.g., UEs 101) over a network. Such servers may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Generally, the AS(s) 130 offer applications or services that use IP/network resources. As examples, the server(s) may provide traffic management services, cloud computing services, content streaming services, immersive gaming experiences, social networking and/or microblogging services, one or more communication services (e.g., VoIP sessions, PTT sessions, group communication sessions, social networking services, etc.), and/or other like services for the UEs 101 via the CN 120.

Figure 2:
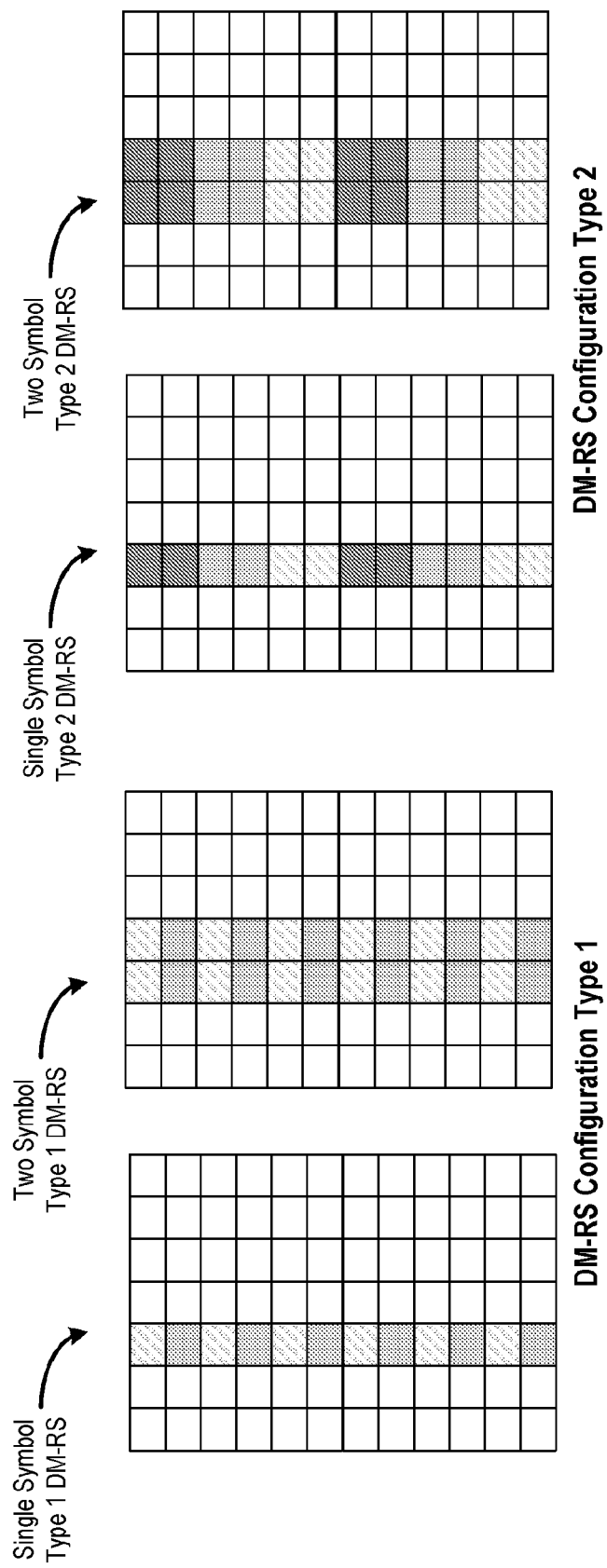
FIG. 2 illustrates the different types of demodulation reference signal (DM-RS) for 5G/NR implementations.

FIG. 2 illustrates the different types of DM-RS for NR implementations. DM-RS is used by a receiver (e.g., UE 101 for DL transmission or RAN node 111 for UL transmissions) to estimate a radio channel for demodulation of a corresponding physical channel. For example, the UE 101 may use the DM-RS for channel estimation for PDSCH data demodulation and PUSCH data demodulation. In NR, a front-loaded DM-RS structure is used as a baseline to achieve low-latency decoding. In a time-frequency resource grid, the front-loaded DM-RS can be located just after the control region, followed by a data region. Once the channel is estimated based on the front-loaded DM-RS, the receiver can coherently demodulate the data in the data region. The term "front-loaded" refers to the first occurrence of DMRS in a scheduled slot. Additional DM-RS occasions/symbols may be present in (or configured for) the later part of the slot, which may be used to support high-speed (high mobility) scenarios. Various DMRS patterns for data demodulation are supported where at least one configuration supports a front-loaded DMRS pattern that is mapped over 1 or 2 adjacent OFDM symbols. The DMRS type and configuration of front-loaded and additional DMRS are identical in some embodiments. Furthermore, DMRS configurations and positions/locations of the corresponding DMRS in the slot also depend on PDSCH/PUSCH mapping type A or B (see e.g., TS 38.211 v15.3.0).

NR defines two time-domain PDSCH mapping types, which differ in the location of the first DM-RS symbol: PDSCH Mapping Type A and PDSCH Mapping Type B. In Mapping Type A, the first DM-RS is located in the second or the third symbol of the slot, and the DM-RS is mapped relative to the start of the slot boundary. The first DM-RS occasion is located in the second or the third symbol in the DL slot since a CORESET is positioned at the beginning of a slot. In Mapping Type B, the first DM-RS is positioned in the first symbol of the data allocation. In Mapping Type B, the DM-RS location is not given relative to the slot boundary, and instead, the DM-RS location is relative to where the data is/are located.

DM-RS may be configured to each UE 101 using a dynamic mechanism (e.g., DCI based configuration), a semi-static mechanism (e.g., RRC based configuration), or a combination thereof. For example, the mapping type for PDSCH is usually dynamically signaled using DCI, while the mapping type for PUSCH is usually semi-statically configured using RRC. In another example, the DM-RS configuration type, the maximum number of front-loaded DMRS symbols (e.g., 1 or 2), and additional DM-RS positions are semi-statically configured by RRC parameters; and the actual number of front-loaded symbols, the assigned DMRS ports, and the potential presence of other ports in non-assigned CDM-Groups are dynamically indicated using DCI (see e.g., TS 38.212 v15.3.0).

Different DM-RS patterns can be configured, which are separated in time, frequency, and code domains. DM-RS has two configuration types, including Configuration Type 1 and Configuration Type 2, which are distinguished in frequency-domain mapping and the maximum number of orthogonal reference signals (RSs). The different configuration types are used to map the PDSCH DM-RS to physical resources in different ways, and which the UE 101 determines from the RRC parameter dmrs-Type. DM-RS Configuration Type 1 can provide up to four orthogonal RSs using single symbol DM-RS and up to eight orthogonal RSs using a two symbol (or "double symbol") DM-RS, whereas DM-RS Configuration Type 2 can provide 6 and 12 orthogonal RSs depending on the number of symbols. Different PDSCH mapping types can be combined with different RS types. Both DM-RS Configuration Type 1 and DM-RS Configuration Type 2 can occupy two OFDM symbols with ports multiplexed using time domain (TD) OCC (TD-OCC) and frequency domain (FD) OCC (FD-OCC).

3GPP NR supports multiple stream transmissions, which allows a single UE 101 or TRP to transmit (or be scheduled to transmit) multiple streams (or multiple layers), or multiple UEs 101 or TRPs can simultaneously transmit (or be scheduled to transmit) multiple streams depending on the channel conditions. In order to support multi-stream (multi-layer) multiple input multiple output (MIMO) transmission, multiple orthogonal DMRS sequences are used, one DMRS sequence for each stream/layer. This is achieved by assigning a single antenna port to the demodulation of each stream/layer. Since the DMRS of a stream is independently decoded from other DMRS of other streams for channel estimation of that stream, the DMRS sequences must be orthogonally separated to avoid interference. Orthogonality is achieved by Frequency Division Multiplexing (FDM) (e.g., comb structure), Time Division Multiplexing (TDM), and/or Code Division Multiplexing (CDM) (e.g., with cyclic shift of the base sequence or orthogonal cover codes (OCCs)). Distinct orthogonal DMRS sequences, each corresponding to an antenna port, share the same time-frequency resources in a CDM group. At least 8 orthogonal DL DMRS ports are supported for single user (SU)-MIMO and a maximum of 12 orthogonal DL DMRS ports are supported for multi-user (MU)-MIMO.

Each CDM group includes DM-RS ports that are mapped to REs as a group, which are shown as different shaded REs in FIG. 2. DM-RS ports in the same CDM group are multiplexed using the same resources and using an OCC. For example, an FD-OCC is used to multiplex two DMRS ports together into a pair of symbols, so every pair of REs in the two symbol DM-RS configurations use a length-2 OCC. Additionally, a TD-OCC can be used to extend the multiplexing capacity of a CDM group to four ports. This means that within each shaded RE in FIG. 2, there may be four ports. In other words, for DM-RS Configuration Type 1, a total of four DM-RS ports can be multiplexed into one symbol, and a total of eight DM-RS ports can be multiplexed into two symbols. The DMRS ports and association with OCC and CDM-Groups for DL DMRS are shown by Table 1 and Table 2 infra (see e.g., Table 7.4.1.1.2-1 and Table 7.4.1.1.2-2 in 3GPP TS 38.211 v15.3.0 (2018-09) (hereinafter "TS 38.211 v15.3.0")).

DM-RS Configuration Type 1 has two CDM port groups with each group occupying six orthogonal frequency REs within a PRB on a single OFDM symbol. DM-RS Configuration Type 1 uses a comb-2 structure with two CDM Groups and a length-2 FD-OCC per pair of alternating REs in each CDM-Group. Since DM-RS Configuration Type 1 has two CDM port groups, Single Symbol DM-RS Configuration Type 1 is able to multiplex four DMRS ports, with two DMRS ports per CDM group. Single Symbol DM-RS Configuration Type 1 can support a maximum of four orthogonal DM-RS ports with two DM-RS ports multiplexed within each CDM group using FD-OCC. For Single Symbol DM-RS Configuration Type 1, each CDM Group supports two orthogonally multiplexed DM-RS ports or MIMO layers (e.g., Single Symbol DM-RS Configuration Type 1 supports a total of four orthogonal DM-RS ports). Double Symbol DM-RS Configuration Type 1 can support a maximum of eight ports with four ports in each CDM Group. For Double Symbol DM-RS Configuration Type 1, additional multiplexing of DMRS ports in the TD is achieved using length-2 time domain OCC. In this case, each CDM Group includes FD-OCC and TD-OCC multiplexing and supports four orthogonal DM-RS ports (e.g., a total of eight orthogonal DM-RS ports are supported).

DM-RS Configuration Type 2 has three CDM port groups with each group occupying four orthogonal REs within a PRB on a single OFDM symbol. DM-RS Configuration Type 2 uses a comb-3 structure with three CDM-Groups and length-2 FD-OCC per pair of adjacent REs in each CDM-Group. Single Symbol DM-RS Configuration Type 2 can support a maximum of 6 orthogonal DMRS ports with each CDM-group having two DM-RS ports multiplexed using FD-OCC. For Single Symbol DM-RS Configuration Type 2, each CDM-Group supports two orthogonal DMRS ports and a total of 6 orthogonal DMRS ports are supported. Two Symbol DM-RS Configuration Type 2 can support a maximum of twelve orthogonal ports with four ports in each CDM-Group. For Two Symbol DM-RS Configuration Type 2, TD-OCC is used to multiplex a total of four ports in each CDM-Group and a total of twelve orthogonal DMRS ports across three CDM-Groups.

When receiving PDSCH scheduled by DCI format 1_0 or receiving PDSCH before dedicated higher layer configuration of any of the parameters dmrs-AdditionalPosition, maxLength and dmrs-Type, the UE 101 assumes that the PDSCH is not present in any symbol carrying DM-RS except for PDSCH with allocation duration of 2 symbols with PDSCH mapping type B (e.g., described in subclause 7.4.1.1.2 of TS 38.211 v15.3.0), and a front-loaded Single Symbol DM-RS Configuration Type 1 on DM-RS port 1000 is transmitted, and that all the remaining orthogonal antenna ports are not associated with transmission of PDSCH to another UE 101. Additionally or alternatively, for PDSCH with mapping type A, the UE 101 assumes dmrs-AdditionalPosition='pos2' and up to two additional single symbol DM-RS (e.g., Single Symbol DM-RS Configuration Type 1) present in a slot according to the PDSCH duration indicated in the DCI as defined in Subclause 7.4.1.1 of TS 38.211 v15.3.0. Additionally or alternatively, for PDSCH with allocation duration of 7 symbols for normal CP or 6 symbols for extended CP with mapping type B, the UE 101 assumes one additional single-symbol DM-RS (e.g., Single Symbol DM-RS Configuration Type 1) present in the 5th or $6^{th}$ symbol when the front-loaded DM-RS symbol is in the $1^{st}$ or $2^{nd}$ symbol respectively of the PDSCH allocation duration, otherwise the UE 101 assumes that the additional DM-RS symbol is not present. Additionally or alternatively, for PDSCH with allocation duration of 4 symbols with mapping type B, the UE 101 assumes that no additional DM-RS are present. Additionally or alternatively, for PDSCH with allocation duration of 2 symbols with mapping type B, the UE 101 assumes that no additional DM-RS are present, and the UE 101 assumes that the PDSCH is present in the symbol carrying DM-RS.

When receiving PDSCH scheduled by DCI format 1_1 by PDCCH with CRC scrambled by C-RNTI, MCS-C-RNTI, or CS-RNTI, the UE 101 may be configured with the higher layer parameter dmrs-Type, and the configured DM-RS configuration type is used for receiving PDSCH in as defined in Subclause 7.4.1.1 of TS 38.211 v15.3.0. Additionally or alternatively, the UE 101 may be configured with the maximum number of front-loaded DM-RS symbols for PDSCH by higher layer parameter maxLength given by DMRS-DownlinkConfig. If maxLength is set to 'len1', single-symbol DM-RS can be scheduled for the UE by DCI, and the UE 101 can be configured with a number of additional DM-RS for PDSCH by higher layer parameter dmrs-AdditionalPosition, which can be set to 'pos0', 'pos1', 'pos 2' or 'pos 3'. If maxLength is set to 'len2', both single-symbol DM-RS and double symbol DM-RS can be scheduled for the UE 101 by DCI, the UE 101 can be configured with a number of additional DM-RS for PDSCH by higher layer parameter dmrs-AdditionalPosition, which can be set to 'pos0' or 'post'. Additionally or alternatively, the UE 101 assumes to receive additional DM-RS as specified in Table 3 and Table 4 as described in Subclause 7.4.1.1.2 of TS 38.211 v15.3.0.

For the UE-specific reference signals generation as defined in Subclause 7.4.1.1 of TS 38.211 v15.3.0, the UE 101 can be configured by higher layers with one or two scrambling identity(s), $n_{ID}^{DMRS,i}$ i=0,1 which are the same for both PDSCH mapping Type A and Type B.

The UE 101 may be scheduled with a number of DM-RS ports by the antenna port index in DCI format 11 as described in Subclause 7.3.1.2 of TS 38.212 v15.3.0. For DM-RS Configuration Type 1, if the UE 101 is scheduled with one codeword and assigned with the antenna port mapping with indices of {2, 9, 10, 11 or 30} in Table 7.3.1.2.2-1 and Table 7.3.1.2.2-2 of Subclause 7.3.1.2 of TS 38.212 v15.3.0, or if the UE 101 is scheduled with two codewords, the UE 101 may assume that all the remaining orthogonal antenna ports are not associated with transmission of PDSCH to another UE 101.

For DM-RS Configuration Type 2, if the UE 101 is scheduled with one codeword and assigned with the antenna port mapping with indices of {2, 10 or 23} in Table 7.3.1.2.2-3 and Table 7.3.1.2.2-4 of Subclause 7.3.1.2 of TS 38.212 v15.3.0, or if the UE 101 is scheduled with two codewords, the UE 101 may assume that all the remaining orthogonal antenna ports are not associated with transmission of PDSCH to another UE 101.

The UE 101 is not expected to be simultaneously configured with the maximum number of front-loaded DM-RS symbols for PDSCH by higher layer parameter maxLength being set equal to 'len2' and more than one additional DM-RS symbol as given by the higher layer parameter dmrs-AdditionalPosition.

The UE 101 is not expected to assume co-scheduled UE(s) with different DM-RS configuration(s) with respect to the actual number of front-loaded DM-RS symbol(s), the actual number of additional DM-RS, the DM-RS symbol location, and DM-RS configuration type as described herein and in subclause 7.4.1.1 of TS 38.211 v15.3.0.

The UE 101 does not expect the precoding of the potential co-scheduled UE(s) in other DM-RS ports of the same CDM group to be different in the PRG-level grid configured to the UE 101 with PRG=2 or 4. The UE 101 does not expect the resource allocation of the potential co-scheduled UE(s) in other DM-RS ports of the same CDM group to be misaligned in the PRG-level grid to the UE 101 with PRG=2 or 4. When receiving PDSCH scheduled by DCI format 1_1, the UE 101 assumes that the CDM groups indicated in the configured index from Tables 7.3.1.2.2-1, 7.3.1.2.2-2, 7.3.1.2.2-3, 7.3.1.2.2-4 of TS 38.212 v15.3.0 contain potential co-scheduled downlink M-RS and are not used for data transmission, where "1", "2" and "3" for the number of DM-RS CDM group(s) in Tables 7.3.1.2.2-1, 7.3.1.2.2-2, 7.3.1.2.2-3, 7.3.1.2.2-4 of TS 38.212 v15.3.0 correspond to CDM group 0, {0,1}, {0,1,2}, respectively.

When receiving PDSCH scheduled by DCI format 1_0, the UE 101 assumes the number of DM-RS CDM groups without data is 1 which corresponds to CDM group 0 for the case of PDSCH with allocation duration of 2 symbols, and the UE 101 assumes that the number of DM-RS CDM groups without data is 2 which corresponds to CDM group {0,1} for all other cases.

The UE 101 is not expected to receive PDSCH scheduling DCI which indicates CDM group(s) with potential DM-RS ports which overlap with any configured CSI-RS resource(s) for that UE 101.

If the UE 101 receives the DM-RS for PDSCH and an SS/PBCH block in the same OFDM symbol(s), then the UE 101 may assume that the DM-RS and SS/PBCH block are quasi co-located with 'QCL-TypeD', if 'QCL-TypeD' is applicable. Furthermore, the UE 101 may not expect to receive DM-RS in resource elements that overlap with those of the SS/PBCH block, and the UE 101 can expect that the same or different subcarrier spacing is configured for the DM-RS and SS/PBCH block in a CC except for the case of 240 kHz where only different subcarrier spacing is supported.

Additionally, the UE 101 can be configured with a list of up to M TCI-State configurations within the higher layer parameter PDSCH-Config to decode PDSCH according to a detected PDCCH with DCI intended for the UE 101 and the given serving cell, where M is a number and depends on the UE capability maxNumberActiveTCI-PerBWP. Each TCI-State contains parameters for configuring a quasi co-location (QCL) relationship between one or two DL RSs and the DM-RS ports of the PDSCH, the DM-RS port of PDCCH or the CSI-RS port(s) of a CSI-RS resource. The QCL relationship is configured by the higher layer parameter qcl-Type1 for the first DL RS, and qcl-Type2 for the second DL RS, if configured. For the case of two DL RSs, the QCL types are not be the same, regardless of whether the references are to the same DL RS or different DL RSs. The QCL types corresponding to each DL RS are given by the higher layer parameter qcl-Type in QCL-Info and may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; and/or 'QCL-TypeD': {Spatial Rx parameter}.

The UE 101 can receive an activation command, as described in subclause 6.1.3.14 of 3GPP TS 38.321 v15.3.0 (2018-09), used to map up to 8 Transmission Configuration Indicator/Indication (TCI) states to the codepoints of the DCI field 'Transmission Configuration Indication'. When the HARQ-ACK corresponding to the PDSCH carrying the activation command is transmitted in slot n, the indicated mapping between TCI states and codepoints of the DCI field 'Transmission Configuration Indication' should be applied starting from the first slot that is after slot $n+3N_{slot}^{subframe,\mu}$. After the UE 101 receives an initial higher layer configuration of TCI states and before reception of the activation command, the UE 101 may assume that the DM-RS ports of PDSCH of a serving cell are quasi co-located with the SS/PBCH block determined in the initial access procedure with respect to 'QCL-TypeA', and when applicable, also with respect to 'QCL-TypeD'.

If the UE 101 is configured with the higher layer parameter tci-PresentInDCI that is set as 'enabled' for the CORESET scheduling the PDSCH, the UE 101 assumes that the TCI field is present in the DCI format 1_1 of the PDCCH transmitted on the CORESET. If tci-PresentInDCI is not configured for the CORESET scheduling the PDSCH or the PDSCH is scheduled by a DCI format 1_0, and the time offset between the reception of the DL DCI and the corresponding PDSCH is equal to or greater than a threshold timeDurationForQCL, where the threshold is based on reported UE capability 3GPP TS 38.306 v15.2.0 (2018-06), for determining PDSCH antenna port quasi co-location, the UE 101 assumes that the TCI state or the QCL assumption for the PDSCH is identical to the TCI state or QCL assumption whichever is applied for the CORESET used for the PDCCH transmission.

If the tci-PresentInDCI is set as 'enabled', the TCI field in the DCI in the scheduling component carrier points to the activated TCI states in the scheduled component carrier or DL BWP and when the PDSCH is scheduled by DCI format 1_1, the UE 101 uses the TCI-State according to the value of the 'Transmission Configuration Indication' field in the detected PDCCH with DCI for determining PDSCH antenna port quasi co-location. The UE 101 may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability 3GPP TS 38.306 v15.2.0 (2018-06). When the UE 101 is configured with a single slot PDSCH, the indicated TCI state should be based on the activated TCI states in the slot with the scheduled PDSCH. When the UE 101 is configured with a multi-slot PDSCH, the indicated TCI state should be based on the activated TCI states in the first slot with the scheduled PDSCH, and UE 101 expects the activated TCI states are the same across the slots with the scheduled PDSCH. When the UE 101 is configured with CORESET associated with a search space set for cross-carrier scheduling, the UE 101 expects tci-PresentInDci is set as 'enabled' for the CORESET, and if one or more of the TCI states configured for the serving cell scheduled by the search space set contains 'QCL-TypeD', the UE 101 expects the time offset between the reception of the detected PDCCH in the search space set and the corresponding PDSCH is larger than or equal to the threshold timeDurationForQCL.

For both the cases when tci-PresentInDCI is set to 'enabled' and tci-PresentInDCI is not configured in RRC connected mode, if the offset between the reception of the DL DCI and the corresponding PDSCH is less than the threshold timeDurationForQCL, the UE 101 may assume that the DM-RS ports of PDSCH of a serving cell are quasi co-located with the RS(s) with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE 101. In this case, if the 'QCL-TypeD' of the PDSCH DM-RS is different from that of the PDCCH DM-RS with which they overlap in at least one symbol, the UE 101 is expected to prioritize the reception of PDCCH associated with that CORESET. This also applies to the intra-band CA case (when PDSCH and the CORESET are in different component carriers). If none of configured TCI states for the serving cell of scheduled PDSCH contains 'QCL-TypeD', the UE 101 obtains the other QCL assumptions from the indicated TCI states for its scheduled PDSCH irrespective of the time offset between the reception of the DL DCI and the corresponding PDSCH.

For the DM-RS of PDCCH, the UE 101 expects that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource; QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition; or 'QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

For the DM-RS of PDSCH, the UE 101 expects that a TCI-State indicates one of the following quasi co-location type(s): 'QCL-TypeA' with a CSI-RS resource in a NZP-CSI-RS-ResourceSet configured with higher layer parameter trs-Info and, when applicable, 'QCL-TypeD' with the same CSI-RS resource; 'QCL-TypeA' with a CSI-RS resource in a NZP-CSI-RS-ResourceSet configured with higher layer parameter trs-Info and, when applicable, 'QCL-TypeD' with a CSI-RS resource in an NZP-CSI-RS-ResourceSet configured with higher layer parameter repetition; or QCL-TypeA' with a CSI-RS resource in a NZP-CSI-RS-ResourceSet configured without higher layer parameter trs-Info and without higher layer parameter repetition and, when applicable, 'QCL-TypeD' with the same CSI-RS resource.

Figure 3:
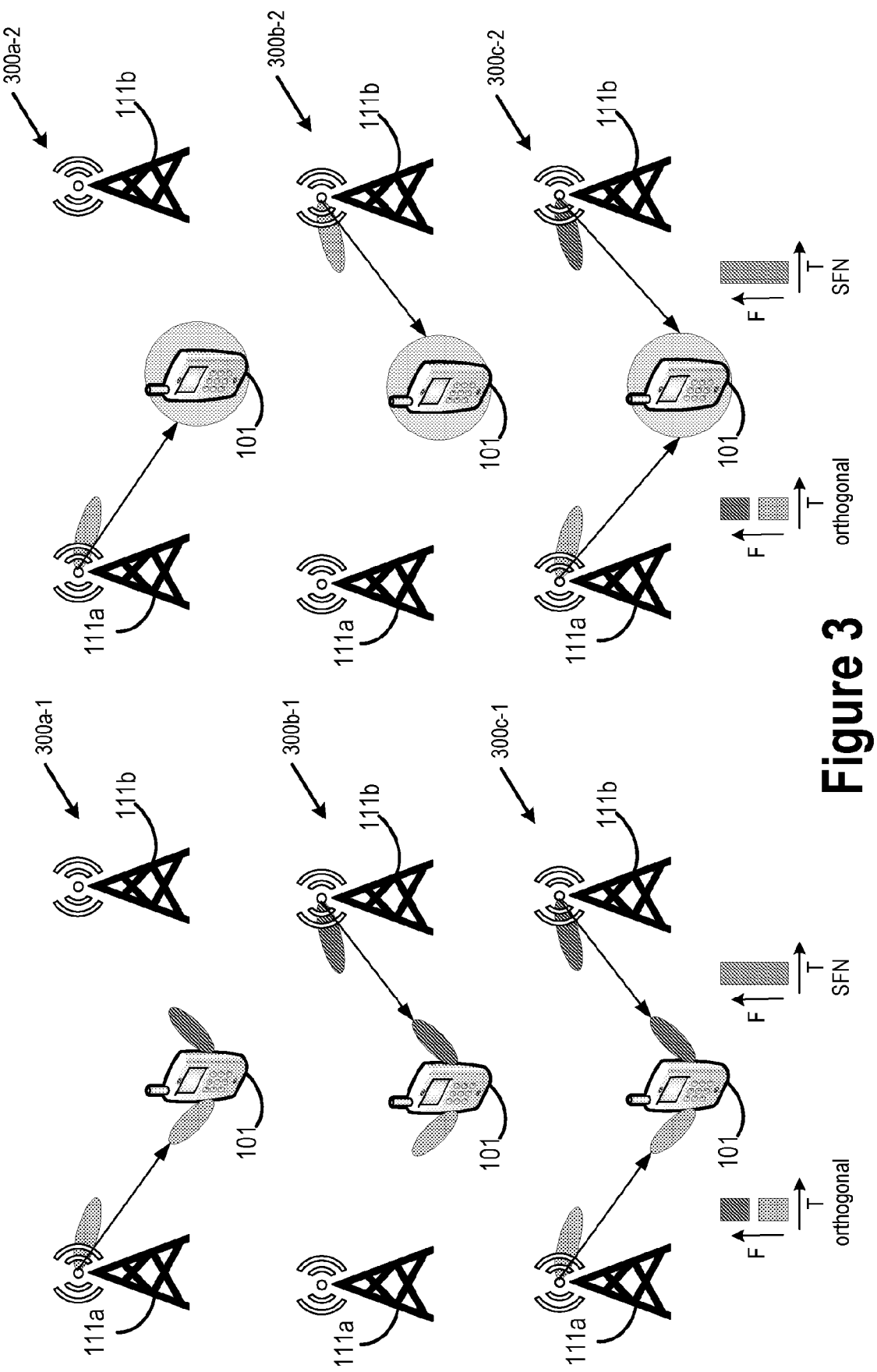
FIG. 3 illustrates various examples of multi-Transmission Reception Point (TRP) and multi-Downlink Control Information (DCI) operation.

FIG. 3 illustrates multiple examples of multi-TRP and multi-DCI operation. In case of DMRS transmission and reception from multiple TRPs, there can be different cases namely single DCI or multi-DCI based. Example scenario 300a-1 shows for frequency range 2 (FR2) a DCI transmitted from TRP_0 (of RAN node 111a) dynamically (DPS), and example scenario 300a-2 shows for frequency range 1 (FR1) a DCI transmitted from TRP_0 (of RAN node 111a) dynamically using Dynamic Point Switching (DPS). Example scenario 300b-1 shows a DCI transmitted from TRP_1 (of RAN node 111b) dynamically (DPS) for FR2, and example scenario 300b-2 shows for FR1a DCI transmitted from TRP 2 (of RAN node 111b) dynamically (DPS). Example scenario 300c-1 shows for FR2 a DCI transmitted from TRP_0 (of RAN node 111a) and TRP_1 (of RAN node 111b) in an orthogonal manner (e.g., repetition) or SFN (Subframe Number or System Frame Number) manner. Example scenario 300c-2 shows for FR1 a DCI transmitted from TRP_0 (of RAN node 111a) and TRP_1 (of RAN node 111b) in an orthogonal manner or SFN manner. DPS refers to the capability of the UE 101 to switch between two TRPs for PDSCH reception/PUSCH transmission wherein transmission to/reception from only one TRP happens at any given time instance.

According to various embodiments, configured DM-RS ports may be sub-divided into one or more DM-RS antenna port groups (or simply "DM-RS port groups" or the like). The grouping of DM-RS ports may be based on whether single DCI based multi-TRP transmission scheme and/or multi-DCI based multi-TRP transmission scheme is used.

Single DCI Multi-TRP Transmission Scheme

In one embodiment, the DM-RS port groups can be pre-defined sets of DMRS ports such that all ports within a CDM-Group belong to the same DMRS-Port-Group. As an example, for Type 1 DM-RS, a DM-RS port group may include the following sets of port groups {0, CDM-Group 1, CDM-Group 2, CDM-Group 1+2}, where 0 indicates that no DMRS-Port-Groups are configured. In this embodiment, a CDM-Group implies that all ports mapped to the CDM-Group are part of the DMRS port grouping. For Type-2 DMRS the set of configurable groups could be given by {0, CDM-Group 1, CDM-Group 2, CDM-Group 3, CDM-Group 1+2, CDM-Group 1+3, CDM-Group 2+3, CDM-Group 1+2+3} or sub-sets thereof.

In one embodiment, a DMRS port group configuration can be semi-statically signaled to the UE 101 using the higher layer parameter dmrs-port-group (e.g., in a suitable RRC message). The parameter dmrs-port-group may have values {0, 1}, where 0 indicates no DMRS-Port-Group configuration and 1 indicates possible DMRS-Port-Group configuration. When the UE 101 is configured with one or more dmrs-port-groups having a value of 1, the actual DM-RS port group to be used can be dynamically indicated via DCI signaling from a predetermined set of configurable group values as discussed previously.

In one embodiment, a set of ports that correspond to a DMRS-Port-Group can be dynamically indicated to the UE 101 through DCI signaling with or without an RRC DMRS-Port-Group configuration.

Additionally or alternatively, each DMRS-Port-Group configured to the UE 101 can correspond to transmission from a single TRP. In this embodiment, the UE 101 can implicitly determine the MIMO layers arriving from different TRPs from the DMRS-Port-Group configuration. This embodiment can make use of dynamic and semi-static signaling, or may only use the dynamic DCI based indication.

Additionally or alternatively, multiple DMRS-Port-Groups can be associated with the same TRP. In this embodiment, the Transmission Configuration Indicator/Indication (TCI) may be enhanced to support two QCL information targeting different DM-RS antenna port groups. For example, DCI format 1_1 currently includes a TCI field, which is 0 bits if the higher layer parameter tci-PresentIn-DCI is not enabled; otherwise this field is 3 bits as defined in subclause 5.1.5 of 3GPP TS 38.214 v15.2.0 (2018-06). In this embodiment, the DCI (e.g., DCI format 1_1) may include a second TCI field indicating additional QCL information for the second DM-RS port group. Alternatively, the TCI field/data structure in the RRC configuration, DCI or the MAC Control Element (CE) TCI code points can be extended or expanded to support additional QCL information for the second DM-RS port group. Additionally or alternatively, each DMRS-Port-Group can be associated with different TCI states.

Additionally or alternatively, cross-CDM-Group DMRS port scheduling support is introduced in addition to the signaling support available in Rel-15 NR DMRS antenna port indication tables 7.3.1.1.2-6 to 7.3.1.1.2-23 for UL DM-RS indication in TS 38.212 v15.3.0 and tables 7.3.1.2.2-2 to 7.3.1.2.2-4 for DL DMRS indication in TS 38.212 v15.3.0 for cases when DMRS-Port-Groups are configured. For example, for rank 3 transmission with Type 1 single-symbol DMRS, options to signal DMRS antenna-ports 0, 2, 3 may be included. In this case, port 0 from CDM-Group 1 can belong DMRS-Port-Group 1 and ports 2, 3 from CDM-Group 2 can belong DMRS-Port-Group 2. When one or more DMRS-Port-Groups is/are associated with a different TRP, the UE 101 can implicitly determine the set of layers received from the same TRP.

In one embodiment, DMRS-Port-Groups configured to the UE 101 can contain ports from different CDM-Groups. For example in case of single symbol Type 1 DMRS, a first DMRS-Port-Group can comprise ports {0, 1, 2} and second DMRS-Port-Group can comprise port 3.

Additionally or alternatively, DM-RS CDM-Groups can contain different DMRS-Port-Groups and the total number of TRPs that can orthogonally transmit to the UE 101 is limited only by the total number of supported MIMO layers in downlink.

Additionally or alternatively, DMRS ports in the same DMRS port group can be spatially QCLed. In this case, the UE 101 receives a single DCI and can be configured dynamically with the DMRS-Port-Groups.

In one embodiment, the multi-TRP DM-RS transmission to the UE 101 can be configured in the UE 101 in a transparent manner wherein the UE 101 is unaware of the identities of the TRPs transmitting each MIMO layer.

Additionally or alternatively, the UE 101 can be made aware of the TRP identities for each MIMO layer by configuration of DMRS-Port-Groups. This can be leveraged to design possibly advanced receivers at the UE 101 with improved interference rejection.

Additionally or alternatively, each DMRS-Port-Group can have a different cell-Id ($N_{ID}$) or scrambling ID ($n_{SCID}$) for DMRS PN sequence initialization. Additionally or alternatively, each CDM Group may also have different cell IDs.

Multi-DCI Multi-TRP Transmission Scheme

In one embodiment, each DCI received by the UE 101 can correspond to a different TRP, and the UE 101 is configured with a different DMRS-Port-Group with associated DMRS ports for the corresponding TRP. Each PDCCH and corresponding DCI then becomes associated with a different TCI state.

Additionally, the DMRS configuration with respect to DMRS Type, number of front loaded symbols, number and position of additional DMRS symbols within a slot should be identical for different TRPs transmitting to the same UE 101.

Additionally or alternatively, when multiple TRPs transmit to the same UE 101, the PDSCH mapping type (e.g., DM-RS mapping type A or DM-RS mapping type B) may be identical. In this embodiment, the time duration and/or scheduling may or may not be identical for each of the multiple TRPs.

Additionally or alternatively, the PDSCH mapping type (e.g., PDSCH mapping type A or PDSCH mapping type B) for multiple TRPs transmitting to the same UE 101 may have different time domain durations. In this embodiment, the UE 101 can assume that the same DMRS configuration is applicable in terms of DMRS type, location, and number of additional DMRS symbols from the multiple TRPs. The UE 101 can implicitly determine the presence of additional DMRS symbols from each TRP by the time domain duration of the scheduling. If the additional DMRS symbols configured to the UE 101 fall outside the time domain duration of the scheduled PDSCH from a given TRP, then they can be assumed to be dropped from the UE 101 perspective for the MIMO layers transmitted from that TRP.

Additionally or alternatively, the PDSCH mapping type (e.g., PDSCH mapping type A or PDSCH mapping type B) for different TRPs transmitting to the same UE 101 can be different. The DMRS configuration type may be identical, but additional DMRS symbols and position my not be identical. In this embodiment, the UE 101 can still assume identical DMRS configuration but the number and position of additional DMRS can depend implicitly on the time domain duration of the PDSCH mapping from each TRP.

Additionally or alternatively, the PDSCH mapping type (e.g., PDSCH mapping type A or PDSCH mapping type B) for different TRPs transmitting to the same UE 101 can be different. The DMRS configuration type can also be different for different DCIs. In this embodiment, RRC parameters may be extended to support multiple DMRS configuration types. The UE 101 can expect to be configured with DMRS information by higher layer signaling for the different DCIs.

Additionally or alternatively, multiple TRPs can transmit DMRS in a quasi-orthogonal manner. The quasi-orthogonal transmission may involve using the same time frequency resource and different PN sequences with distinct seed values leading to low cross-correlation of the sequences used in quasi-orthogonal ports. The quasi-orthogonal transmission of the DMRS may be used when the DMRS resources are not perfectly orthogonal to one another, such as when cross correlation is 0.

Example Implementations

Each of the UEs 101, RAN nodes 111, AP 106, network element(s) 122, application servers 130, and/or any other device or system discussed previously with respect to FIGS. 1-6 may include various hardware and/or software elements, such as those discussed infra with respect to FIGS. 4 and 5.

Figure 4:
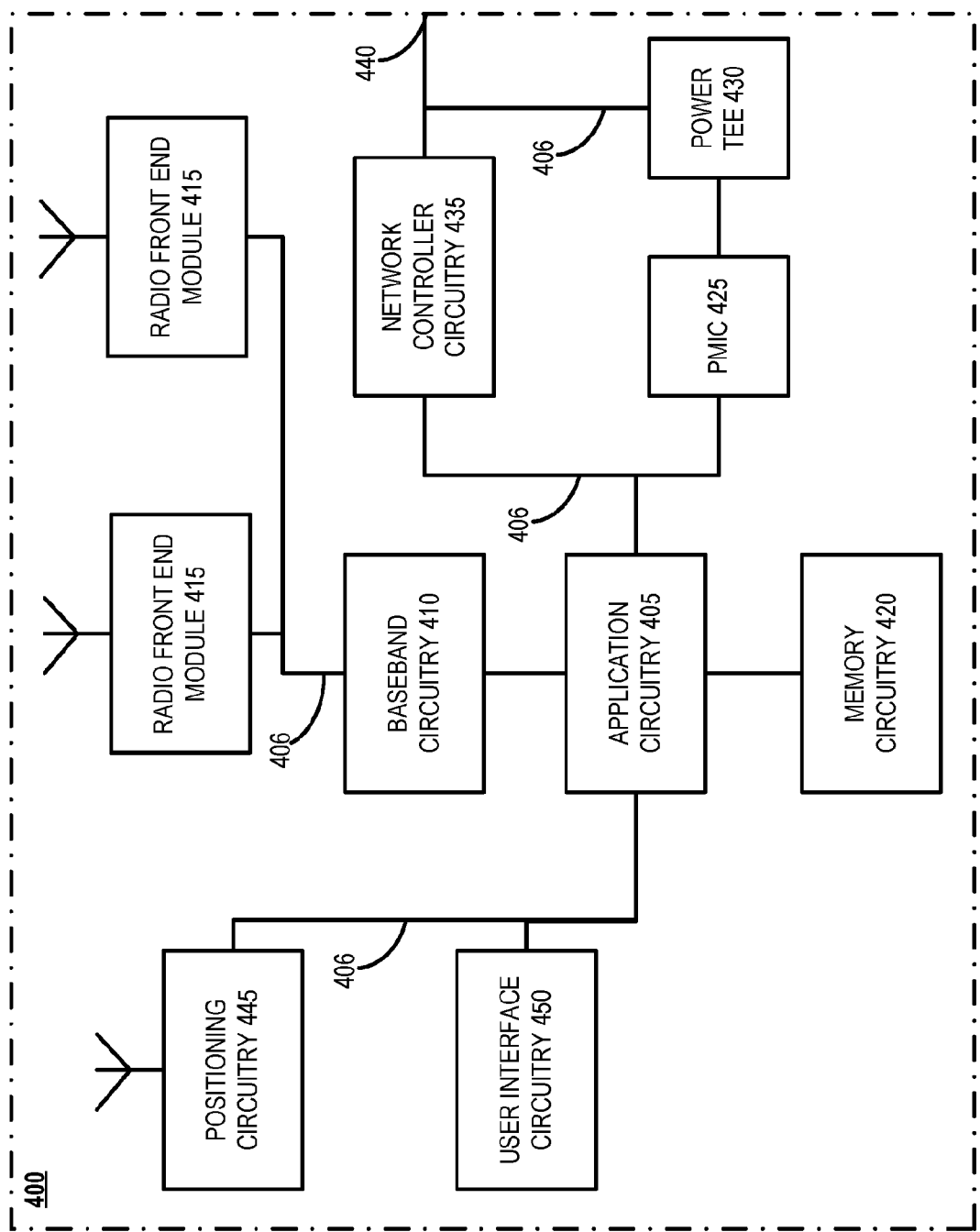
FIG. 4 illustrates an example of infrastructure equipment in accordance with various embodiments.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. The term "circuitry" as used herein refers to a circuit or system of multiple circuits configured to perform a particular function in an electronic device. The circuit or system of circuits may be part of, or include one or more hardware components, such as logic circuits, processor(s) (shared, dedicated, or group) and/or memory (shared, dedicated, or group), Integrated Circuits (ICs), Application-specific ICs (ASICs), Field Programmable Gate Arrays (FPGAs), Digital Signal Processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" refers to one or more independent electronic circuits packaged onto a circuit board, FPGA, ASIC, SoC, SiP, etc., configured to provide a basic function within a computer system. A "module" may include a processor circuitry (shared, dedicated, or group) and/or memory circuitry shared, dedicated, or group), etc., that execute one or more software or firmware programs, a combinational logic circuit, and/or other suitable components that provide the described functionality. As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

Application circuitry 405 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The baseband circuitry 410 includes one or more processing devices (e.g., baseband processors) to carry out various protocol and radio control functions. Baseband circuitry 410 may interface with application circuitry of system 400 for generation and processing of baseband signals and for controlling operations of the RFEMs 415. The baseband circuitry 410 may handle various radio control functions that enable communication with one or more radio networks via the RFEMs 415. The baseband circuitry 410 may include circuitry such as, but not limited to, one or more single-core or multi-core processors (e.g., one or more baseband processors) or control logic to process baseband signals received from a receive signal path of the RFEMs 415, and to generate baseband signals to be provided to the RFEMs 415 via a transmit signal path. In various embodiments, the baseband circuitry 410 may implement a RTOS to manage resources of the baseband circuitry 410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry 406 or IX 406, which may include any number of bus and/or IX technologies such as Industry Standard Architecture (ISA), extended ISA, inter-integrated circuit ($I^2C$), Serial Peripheral Interface (SPI), point-to-point interfaces, power management bus (PMBus), Peripheral Component Interconnect (PCI), PCI express (PCIe), PCI extended (PCIx), Intel® Ultra Path Interconnect (UPI), Intel® Accelerator Link (IAL), Coherent Accelerator Processor Interface (CAPI), OpenCAPI, Intel® QuickPath Interconnect (QPI), Intel® Omni-Path Architecture (OPA) IX, RapidIO™ system IXs, Cache Coherent Interconnect for Accelerators (CCIA), Gen-Z Consortium IXs, a HyperTransport interconnect, and/or any number of other IX technologies. The IX technology may be a proprietary bus, for example, used in an SoC based system.

Figure 5:
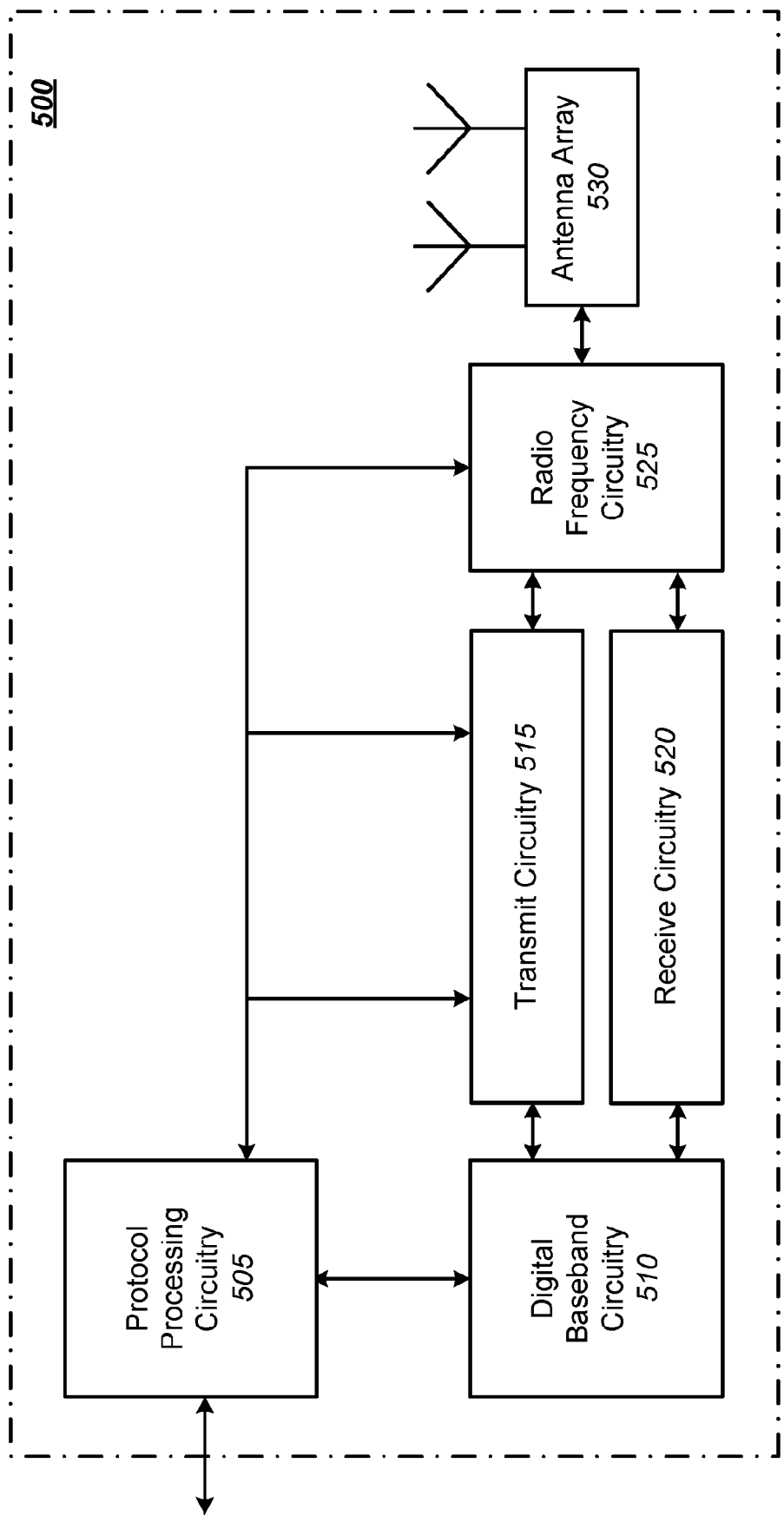
FIG. 5 illustrates an example of communication circuitry that may be used to practice the embodiments discussed herein.

FIG. 5 illustrates an example of communication circuitry 500 that may be used to practice the embodiments discussed herein. Components as shown by FIG. 5 are shown for illustrative purposes and may include other components not shown by FIG. 5, or the elements shown by FIG. 5 may by alternatively be grouped according to functions.

The communication circuitry 500 includes protocol processing circuitry 505, which operates or implements various protocol layers/entities of one or more wireless communication protocols. In one example, the protocol processing circuitry 505 may operate Long Term Evolution (LTE) protocol entities and/or Fifth Generation (5G)/New Radio (NR) protocol entities when the communication circuitry 500 is a cellular radiofrequency communication system, such as millimeter wave (mmWave) communication circuitry or some other suitable cellular communication circuitry. In this example, the protocol processing circuitry 505 would operate medium access control (MAC), radio link control (RLC), packet data convergence protocol (PDCP), service data adaptation protocol (SDAP), radio resource control (RRC), and non-access stratum (NAS) functions. In another example, the protocol processing circuitry 505 may operate one or more IEEE-based protocols when the communication circuitry 500 is WiFi communication system. In this example, the protocol processing circuitry 505 would operate MAC and logical link control (LLC) functions.

The protocol processing circuitry 505 may include one or more memory structures (not shown) to store program code and data information for operating the protocol functions, as well as one or more processing cores (not shown) to execute the program code and perform various operations using the data information. The protocol processing circuitry 505 may include one or more instances of control circuitry (not shown) to provide control functions for the digital baseband circuitry 510, transmit circuitry 515, receive circuitry 520, and/or radiofrequency (RF) circuitry 525. In some embodiments, the protocol processing circuitry 505 and/or the baseband circuitry 510 correspond to the baseband circuitry 410 of FIG. 4.

The communication circuitry 500 also includes digital baseband circuitry 510, which implements physical layer (PHY) functions including hybrid automatic repeat request (HARQ) functions, scrambling and/or descrambling, (en) coding and/or decoding, layer mapping and/or demapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. The modulation/demodulation functionality may include Fast-Fourier Transform (FFT), precoding, or constellation mapping/demapping functionality. The encoding/decoding functionality may include convolution, tail-biting convolution, turbo, Viterbi, Low Density Parity Check (LDPC) coding, polar coding, etc. Embodiments of modulation/demodulation and encoder/decoder functionality are not limited to these examples and may include other suitable functionality in other embodiments.

Baseband processing circuitry 510 and/or protocol processing circuitry 505 may interface with an application platform (e.g., application circuitry 405 of FIG. 4) for generation and processing of baseband signals and for controlling operations of the RF circuitry 525. The digital baseband circuitry 510 may handle various radio control functions that enable communication with one or more radio networks via the RF circuitry 525. The digital baseband circuitry 510 may include circuitry such as, but not limited to, one or more single-core or multi-core processors (e.g., one or more baseband processors) or control logic to process baseband signals received from a receive signal path of the RF circuitry 525 (e.g., via Rx circuitry 520) and to generate baseband signals for a transmit signal path of the RF circuitry 525 (e.g., via Tx circuitry 515). The digital baseband circuitry 510 may comprise a multi-protocol baseband processor or the like.

As mentioned previously, the digital baseband circuitry 510 may include or implement encoder circuitry, which accepts input data, generates encoded data based on the input data, and outputs the encoded data to a modulation mapper. The encoder may also perform one or more of error detecting, error correcting, rate matching, and interleaving. The encoder may further include scrambling based on a scrambling sequence such as those discussed herein.

In various embodiments, the digital baseband circuitry 510 may include or implement a sequence generator to generate, for example, low Peak to Average Power Ratio (low-PAPR) sequences (see e.g., section 5.2.2 of TS 38.211 v15.3.0), pseudo-random noise (PN) sequences (see e.g., section 5.2.1 of TS 38.211 v15.3.0), and/or reference signal sequences. In some embodiments, the sequence generator may be a part of the encoder circuitry. PN sequences are made up of bits (e.g., 1s and 0s) that are supposed to be random. The PN sequence generator may include linear feedback shift registers (LSFR) to generate the PN sequences. Scrambling codes based on Gold codes are used to scramble physical signals prior to transmission. The Gold codes are obtained by combining two PN sequences and performing modulo-2 addition or performing an exclusive OR (XOR) operation on the PN sequences. In embodiments, the sequence generator is used for QPSK modulation uses a pseudo-random Gold sequence, c(n), which is obtained by combining two M-sequences, $x_1$ and $x_2$, of length 31, as described herein.

For example, generic pseudo-random sequences are defined by a length-31 Gold sequence wherein an output sequence c(n) of length $M_{PN}$, where n=0,1, ..., $M_{PN}-1$, is defined by:

$$c(n) = (x_1(n+N_c) + x_2(n+N_c)) \bmod 2$$

$$x_1(n+31) = (x_1(n+3) + (n)) \bmod 2$$

$$x_2(n+31) = (x_2(n+3) + x_2(n+2) + x_2(n+1) + x_2(n)) \bmod 2$$

where $N_C=1600$ and the first m-sequence $x_1(n)$ is initialized with $x_1(0)=1, x_1(n)=0, n=1, 2, \ldots, 30$. In this example, the "c(2n)" and "c(2n+1)" in the reference signal sequence equation may refer to the PN sequence c(n). The initialization of the second m-sequence $x_2(n)$ is denoted by $c_{init} = \sum_{i=0}^{30} x_2(i) \cdot 2^i$ with the value depending on the application of the sequence where $c_{init}$ is the initial condition or initial seed value for the second m-sequence $x_2(n)$.

In various embodiments, the sequence generator generates DM-RS sequences including the pseudo-random sequences. For example, the UE 101 may assume that the sequence r(n), for DM-RS for PDSCH, is defined by:

$$r(n) = \frac{1}{\sqrt{2}}(1 - 2 \cdot c(2n)) + j\frac{1}{\sqrt{2}}(1 - 2 \cdot c(2n+1))$$

where the pseudo-random sequence c(i) is defined in clause 5.2.1 of TS 38.211 v15.3.0. The pseudo-random sequence generator is initialized with:

$$c_{init} = (2^{17}(N_{symb}^{slot} n_{s,f}^\mu + l + 1)(2N_{ID}^{nSCID} + 1) + 2N_{ID}^{nSCID} + n_{SCID}) \bmod 2^{31}$$

where j is an imaginary unit/number equal to the square root of −1 (e.g., $\sqrt{-1}$), l is the OFDM symbol number within the slot; $n_{s,f}^\mu$ is the slot number within a frame; $N_{ID}^0, N_{ID}^1 \in \{0, 1, \ldots, 65535\}$ are given by the higher-layer parameters scramblingID0 and scramblingID1, respectively, in the DMRS-DownlinkConfig IE if provided and the PDSCH is scheduled by PDCCH using DCI format 1_1 with the CRC scrambled by C-RNTI, MCS-C-RNTI, or CS-RNTI; $N_{ID}^0 \in \{0, 1, \ldots, 65535\}$ is given by the higher-layer parameter scramblingID0 in the DMRS-DownlinkConfig IE if provided and the PDSCH is scheduled by PDCCH using DCI format 1_0 with the CRC scrambled by C-RNTI, MCS-C-RNTI, or CS-RNTI; $N_{ID}^{nSCID} = N_{ID}^{cell}$ otherwise; and the quantity $n_{SCID} \in \{0,1\}$ is given by the DM-RS sequence initialization field, in the DCI associated with the PDSCH transmission if DCI format 1_1 in TS 38.212 v15.3.0 is used, otherwise $n_{SCID} = 0$.

The UE 101 may assume that the sequence $r_l(m)$, for DM-RS for PDCCH, is defined by the above equation replacing r(n), with $r_l(m)$ and replacing n with m, and as further discussed by clause 7.4.1.3 of TS 38.211 v15.3.0. The UE 101 may assume that the sequence r(m), for DM-RS for PBCH, is defined by the above equation replacing r(n), with r(m) and replacing n with m, and as further discussed by clause 7.4.1.4 of TS 38.211 v15.3.0.

In various embodiments, the digital baseband circuitry 510 may include or implement a modulation mapper that takes binary digits as input (e.g., the encoded data from the encoder) and produces complex-valued modulation symbols as an output. As an example, for QPSK modulation, pairs of bits, b(2i), b (2i+1), are mapped to complex-valued modulation symbols d(i) according to:

$$d(i) = \frac{1}{\sqrt{2}}[(1 - 2b(2i)) + j(1 - 2b(2i+1))]$$

The modulation mapper may operate any other suitable modulation scheme, such as those discussed by section 5.1 of TS 38.211 v15.3.0. The modulation mapper may map groups containing one or more binary digits, selected from the encoded data, to complex valued modulation symbols according to one or more mapping tables.

In some embodiments, the complex-valued modulation symbols may be input to layer mapper to be mapped to one or more layer mapped modulation symbol streams. The one or more streams of layer mapped symbols may be input to precoder that generates one or more streams of precoded symbols, which may be represented as a block of vectors. The precoder may be configured to perform a direct mapping using a single antenna port, transmit diversity using space-time block coding, or spatial multiplexing. Each stream of precoded symbols may be input to a resource mapper that generates a stream of resource mapped symbols (e.g., resource elements). The resource mapper may map precoded symbols to frequency domain subcarriers and time domain symbols according to a mapping, which may include contiguous block mapping, randomized mapping, and/or sparse mapping according to a mapping code.

According to various embodiments, the modulation mapper (or resource mapper) maps the DM-RS sequence to physical resources (also referred to as "DM-RS resources" or the like) according to the DMRS configuration type. For example, the UE 101 assumes the PDSCH DM-RS is mapped to physical resources according to DM-RS Configuration Type 1 or DM-RS Configuration Type 2 as given by the higher-layer parameter dmrs-Type. The UE 101 assumes that the sequence r(m) is scaled by a factor $\beta_{PDSCH}^{DMRS}$ to conform with the transmission power specified in 3GPP TS 38.214 v15.2.0 (2018-06) and mapped to resource elements $(k,l)_{p,\mu}$ according to:

$$a_{k,l}^{(p,\mu)} = \beta_{PDSCH}^{DMRS} w_f(k') w_t(l') r(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $w_f(k')$, $w_t(l')$, and $\Delta$ are given by Tables 7.4.1.1.2-1 and 7.4.1.1.2-2 and when the resource elements are within the common resource blocks allocated for PDSCH transmission. The reference point for k is subcarrier 0 of the lowest-numbered resource block in CORESET 0 if the corresponding PDCCH is associated with CORESET 0 and Type0-PDCCH common search space and is addressed to SI-RNTI; otherwise, subcarrier 0 in common resource block 0.

The reference point for l and the position $l_0$ of the first DM-RS symbol depends on the mapping type. For PDSCH mapping type A, l is defined relative to the start of the slot, and $l_0=3$ if the higher-layer parameter dmrs-TypeA-Position is equal to 'pos3' and $l_0=2$ otherwise. For PDSCH mapping type B, l is defined relative to the start of the scheduled PDSCH resources, and $l_0=0$.

The position(s) of the DM-RS symbols is given by $\bar{l}$ and duration $l_d$ where, for PDSCH mapping type A, $l_d$ is the duration is between the first OFDM symbol of the slot and the last OFDM symbol of the scheduled PDSCH resources in the slot, for PDSCH mapping type B, $l_d$ is the duration is the number of OFDM symbols of the scheduled PDSCH resources, and according to Tables 7.4.1.1.2-3 and 7.4.1.1.2-4. The case dmrs-AdditionalPosition equals to 'pos3' is only supported when dmrs-TypeA-Position is equal to 'pos2'. For PDSCH mapping type A, $l_d=3$ and $l_d=4$ symbols in Tables 7.4.1.1.2-3 and 7.4.1.1.2-4 respectively is only applicable when dmrs-TypeA-Position is equal to 'pos2'. For PDSCH mapping Type A single-symbol DM-RS, $l_1=11$ except if all of the following conditions are fulfilled in which case $l_1=12$: the higher-layer parameter lte-CRS-ToMatchAround is configured and any PDSCH DM-RS symbol coincides with any symbol containing LTE cell-specific reference signals as indicated by the higher-layer parameter lte-CRS-ToMatchAround; the higher-layer parameters dmrs-AdditionalPosition is equal to 'pos1' and $l_0=3$; and the UE 101 has indicated it is capable of additionalDMRS-DL-Alt.

For PDSCH mapping type B, if the PDSCH duration $l_d$ is 2, 4, or 7 OFDM symbols for normal cyclic prefix or 2, 4, 6 OFDM symbols for extended cyclic prefix, and the PDSCH allocation collides with resources reserved for a search space set associated with a CORESET, $\bar{l}$ is to be incremented such that the first DM-RS symbol occurs immediately after the CORESET and if (a) the PDSCH duration $l_d$ is 2 symbols, the UE is not expected to receive a DM-RS symbol beyond the second symbol, (b) the PDSCH duration $l_d$ is 4 symbols, the UE is not expected to receive a DM-RS symbol beyond the third symbol, (c) the PDSCH duration $l_d$ is 7 symbols for normal cyclic prefix or 6 symbols for extended cyclic prefix, wherein the UE 101 is not expected to receive the first DM-RS beyond the fourth symbol, and if one additional single-symbol DM-RS is configured, the UE only expects the additional DM-RS to be transmitted on the 5th or 6th symbol when the front-loaded DM-RS symbol is in the 1st or 2nd symbol, respectively, of the PDSCH duration, otherwise the UE 101 should expect that the additional DM-RS is not transmitted, and/or (d) if the PDSCH duration $l_d$ is 2 or 4 OFDM symbols, only single-symbol DM-RS is supported.

The time-domain index l' and the supported antenna ports p are given by Table 5 where single-symbol DM-RS is used if the higher-layer parameter maxLength in the DMRS-DownlinkConfig IE is not configured, and/or single-symbol or double-symbol DM-RS is determined by the associated DCI if the higher-layer parameter maxLength in the DMRS-DownlinkConfig IE is equal to 'len2'.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may assume that DMRS ports associated with a PDSCH are QCL with QCL Type A, Type D (when applicable) and average gain. Additionally, the UE 101 may assume that no DM-RS collides with the SS/PBCH block.

TABLE 1

Parameters for PDSCH DM-RS configuration type 1

| | | | $w_f(k')$ | | $w_t(l')$ | |
|---|---|---|---|---|---|---|
| p | CDM group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 2

Parameters for PDSCH DM-RS configuration type 2

| | | | $w_f(k')$ | | $w_t(l')$ | |
|---|---|---|---|---|---|---|
| p | CDM group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

TABLE 3

PDSCH DM-RS positions $\bar{l}$ for single-symbol DM-RS

| | DM-RS positions $\bar{l}$ | | | | | | | |
|---|---|---|---|---|---|---|---|---|
| | PDSCH mapping type A dmrs-AdditionalPosition | | | | PDSCH mapping type B dmrs-AdditionalPosition | | | |
| $l_d$ in symbols | 0 | 1 | 2 | 3 | 0 | 1 | 2 | 3 |
| 2 | — | — | — | — | $l_0$ | $l_0$ | | |
| 3 | $l_0$ | $l_0$ | $l_0$ | $l_0$ | — | — | | |
| 4 | $l_0$ | $l_0$ | $l_0$ | $l_0$ | $l_0$ | $l_0$ | | |
| 5 | $l_0$ | $l_0$ | $l_0$ | $l_0$ | — | — | | |
| 6 | $l_0$ | $l_0$ | $l_0$ | $l_0$ | $l_0$ | $l_0$, 4 | | |
| 7 | $l_0$ | $l_0$ | $l_0$ | $l_0$ | $l_0$ | $l_0$, 4 | | |
| 8 | $l_0$ | $l_0$, 7 | $l_0$, 7 | $l_0$, 7 | — | — | | |
| 9 | $l_0$ | $l_0$, 7 | $l_0$, 7 | $l_0$, 7 | — | — | | |
| 10 | $l_0$ | $l_0$, 9 | $l_0$, 6, 9 | $l_0$, 6, 9 | — | — | | |
| 11 | $l_0$ | $l_0$, 9 | $l_0$, 6, 9 | $l_0$, 6, 9 | — | — | | |
| 12 | $l_0$ | $l_0$, 9 | $l_0$, 6, 9 | $l_0$, 5, 8, 11 | — | — | | |
| 13 | $l_0$ | $l_0$, $l_1$ | $l_0$, 7, 11 | $l_0$, 5, 8, 11 | — | — | | |
| 14 | $l_0$ | $l_0$, $l_1$ | $l_0$, 7, 11 | $l_0$, 5, 8, 11 | — | — | | |

TABLE 4

PDSCH DM-RS positions $\bar{l}$ for double-symbol DM-RS.

| | DM-RS positions $\bar{l}$ | | | | | |
|---|---|---|---|---|---|---|
| | PDSCH mapping type A dmrs-AdditionalPosition | | | PDSCH mapping type B dmrs-AdditionalPosition | | |
| $l_d$ in symbols | 0 | 1 | 2 | 0 | 1 | 2 |
| <4 | — | — | — | — | — | — |
| 4 | $l_0$ | $l_0$ | — | — | — | — |
| 5 | $l_0$ | $l_0$ | — | — | — | — |
| 6 | $l_0$ | $l_0$ | — | $l_0$ | $l_0$ | — |
| 7 | $l_0$ | $l_0$ | — | $l_0$ | $l_0$ | — |
| 8 | $l_0$ | $l_0$ | — | — | — | — |
| 9 | $l_0$ | $l_0$ | — | — | — | — |
| 10 | $l_0$ | $l_0$, 8 | — | — | — | — |
| 11 | $l_0$ | $l_0$, 8 | — | — | — | — |
| 12 | $l_0$ | $l_0$, 8 | — | — | — | — |
| 13 | $l_0$ | $l_0$, 10 | — | — | — | — |
| 14 | $l_0$ | $l_0$, 10 | — | — | — | — |

TABLE 5

PDSCH DM-RS time index l' and antenna ports p

| Single or double symbol DM-RS | l' | Supported antenna ports p | |
|---|---|---|---|
| | | Configuration type 1 | Configuration type 2 |
| single | 0 | 1000-1003 | 1000-1005 |
| double | 0, 1 | 1000-1007 | 1000-1011 |

The UE 101 assumes that the sequence $r_l(m)$, for DM-RS for PDCCH, is mapped to resource elements $(k,l)_{p,\mu}$ as discussed by 7.4.1.3.2 of TS 38.211 v15.3.0. The UE 101 assumes that the sequence r(m), for DM-RS for PBCH, is mapped to resource elements $(k,l)_{p,\mu}$ as described in clause 7.4.3 of TS 38.211 v15.3.0.

In various embodiments, the digital baseband circuitry 510 includes or implements a baseband signal generator (also referred to as a "multicarrier generator") to generate OFDM baseband signals and/or other baseband signals. In these embodiments, the resource mapped symbols from the resource mapper are input to the baseband signal generator which generates time domain baseband symbol(s). The baseband signal generator may generate a time domain signal (e.g., a set of time domain symbols) using, for example, an inverse discrete Fourier transform, commonly implemented as an inverse fast Fourier transform (IFFT) or a filter bank comprising one or more filters. The time-domain signal that results from the IFFT is transmitted across the radio channel. At the receiver, an FFT block is used to process the received signal and bring it into the frequency domain which is used to recover the original data bits.

For example, OFDM baseband signal generation for DM-RS is as follows: The time-continuous signal $s_l^{(p,\mu)}(t)$ on antenna port p and subcarrier spacing configuration $\mu$ for OFDM symbol l in a subframe for any physical channel or signal except PRACH is defined by:

$$s_l^{(p,\mu)}(t) = \sum_{k=0}^{N_{grid}^{size,\mu} N_{sc}^{RB}-1} a_{k,l}^{(p,\mu)} \cdot e^{j2\pi(k+k_0^\mu - N_{grid}^{size,\mu} N_{sc}^{RB}/2)\Delta f(t-N_{CP,l}^\mu T_c - t_{start,l}^\mu)}$$

$$k_0^\mu = (N_{grid,x}^{start,\mu} + N_{grid,x}^{size,\mu}/2)N_{sc}^{RB} - (N_{grid,x}^{start,\mu_0} + N_{grid,z}^{size,\mu_0}/2)2N_{sc}^{RB} 2^{\mu_0-\mu}$$

where $t_{start,l}^\mu \leq t <$ $t_{start,l}^\mu + (N_u^\mu + N_{CP,l}^\mu)T_c$ is the time within the subframe, $$N_u^\mu = 2 \cdot 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^\mu \\ 144\kappa \cdot 2^{-\mu} & \text{normal cyclic prefix, } l \neq 0 \text{ or } l \neq 7 \cdot 2^\mu \end{cases}$$

and where $a_{k,l}^{(p,\mu)}$ is/are the resource mapped symbol(s); k is a subcarrier index; $N_{symb}^{slot}$ is the number of symbols per slot; $\Delta f$ is the SCS (see e.g., table 6 infra) and $\mu$ is the SCS configuration; $\mu_0$ is the largest $\mu$ value among the subcarrier spacing configurations by the higher-layer parameter scs-SpecificCarrierList; $N_{CP,l}^\mu$ is the CP length for SCS configuration $\mu$ and OFDM symbol l, where $l \in \{0, 1, \ldots N_{slot}^{subframe,\mu} N_{symb}^{slot}-1\}$, where $N_{slot}^{subframe,\mu}$ is the number of slots per subframe for subcarrier spacing configuration $\mu$, and $N_{symb}^{slot}$ is the number of symbols per slot); $N_{grid,x}^{start,\mu}$ is the start of the resource grid and $N_{grid,x}^{size,\mu}$ is the size of the resource grid (where x is "DL" or "UL" for the DL resource grid or UL resource grid, respectively); $N_{SC}^{RB}$ is the number of subcarriers per resource block; $T_c$ is the basic time unit for NR; and the starting position of OFDM symbol l for SCS configuration $\mu$ in a subframe is given by:

$$t_{start,l}^\mu = \begin{cases} 0 & l = 0 \\ t_{start,l-1}^\mu + (N_u^\mu + N_{CP,l-1}^\mu) \cdot T_c & \text{otherwise} \end{cases}$$

TABLE 6

Supported transmission numerologies

| $\mu$ | $\Delta f = 2^\mu \cdot 15$[kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

Multiple OFDM numerologies are supported as given by table 6 where $\Delta f$ is the SCS, and where $\mu$ and the CP for a BWP are obtained from the higher-layer parameter subcarrierSpacing and cyclicPrefix, respectively. In table 1, the normal CP refers to a CP duration of 4.7 microseconds ($\mu$s) (or 5.2 $\mu$s) and seven symbols per slot, and the extended CP refers to a CP duration of 16.67 $\mu$s and 6 symbols per slot.

In various embodiments, the digital baseband circuitry 510 includes or implements RIM-RS detection circuitry, wherein the digital baseband circuitry 510 monitors (or attempts to detect) one or more RIM-RS candidates in one or more (pre)configured RIM-RS monitoring occasions. The RIM-RS monitoring occasions may be based on the RIM-RS time and frequency resource allocation 400 of FIG. 4, the RIM-RS resource mapping embodiments discussed previously, and/or the RIM-RS configuration embodiments discussed previously.

The communication circuitry 500 also includes transmit (Tx) circuitry 515 and receive (Rx) circuitry 520. The Tx circuitry 515 is configured to convert digital baseband signals into analog signals for transmission by the RF circuitry 525. To do so, in one embodiment, the Tx circuitry 515 includes various components, such as digital to analog converters (DACs), analog baseband circuitry, up-conversion circuitry, and filtering and amplification circuitry. Additionally or alternatively, the Tx circuitry 515 may include digital transmit circuitry and output circuitry.

The Rx circuitry 520 is configured to convert analog signals received by the RF circuitry 525 into digital baseband signals to be provided to the digital baseband circuitry 510. To do so, in one embodiment, the Rx circuitry 520 includes parallel receive circuitry and/or one or more instances of combined receive circuitry. The parallel receive circuitry and instances of the combined receive circuitry may include Intermediate Frequency (IF) down-conversion circuitry, IF processing circuitry, baseband down-conversion circuitry, baseband processing circuitry, and analog-to-digital converter (ADC) circuitry.

The communication circuitry 500 also includes radiofrequency (RF) circuitry 525 to enable communication with wireless networks using modulated electromagnetic radiation through a non-solid medium. The RF circuitry 525 includes a receive signal path, which may include circuitry to convert analog RF signals (e.g., an existing or received modulated waveform) into digital baseband signals to be provided to the digital baseband circuitry 510 via the Rx circuitry 520. The RF circuitry 525 also includes a transmit signal path, which may include circuitry configured to convert digital baseband signals provided by the digital baseband circuitry 510 via the Tx circuitry 515 to be converted into analog RF signals (e.g., modulated waveform) that will be amplified and transmitted via the antenna array 530.

In various embodiments, RIM-RS modulation (e.g., provided by the RF circuitry 525) and up-conversion (e.g., provided by the Tx circuitry 515) to a carrier frequency $f_0$ of the complex-valued OFDM baseband signal for antenna port p, SCS configuration μ, and OFDM symbol l in a subframe assumed to start at t=0 is given by:

$$\text{Re}\{s_l^{(p,\mu)}(t)e^{j2\pi f_0^{RIM}(t-t_{start,l_0}^{\mu}-N_{CP}^{RIM}T_c)}\}$$

where $f_0^{RIM}$ is the configured reference point for RIM-RS.

RF circuitry 525 may include one or more instances of radio chain circuitry, which may include one or more filters, power amplifiers, low noise amplifiers, programmable phase shifters, and power supplies (not shown). RF circuitry 525 may also include power combining and dividing circuitry. The power combining and dividing circuitry may operate bidirectionally, such that the same physical circuitry may be configured to operate as a power divider when the device is transmitting, and as a power combiner when the device is receiving. In some embodiments, the power combining and dividing circuitry may include wholly or partially separate circuitries to perform power dividing when the device is transmitting and power combining when the device is receiving. The power combining and dividing circuitry may include passive circuitry comprising one or more two-way power divider/combiners arranged in a tree. In some embodiments, the power combining and dividing circuitry may include active circuitry comprising amplifier circuits.

The communication circuitry 500 also includes antenna array 530. The antenna array 530 include one or more antenna elements. The antenna array 530 may be a plurality of microstrip antennas or printed antennas that are fabricated on the surface of one or more printed circuit boards. The antenna array 530 may be formed in as a patch of metal foil (e.g., a patch antenna) in a variety of shapes, and may be coupled with the RF circuitry 525 using metal transmission lines or the like.

Figure 6A:
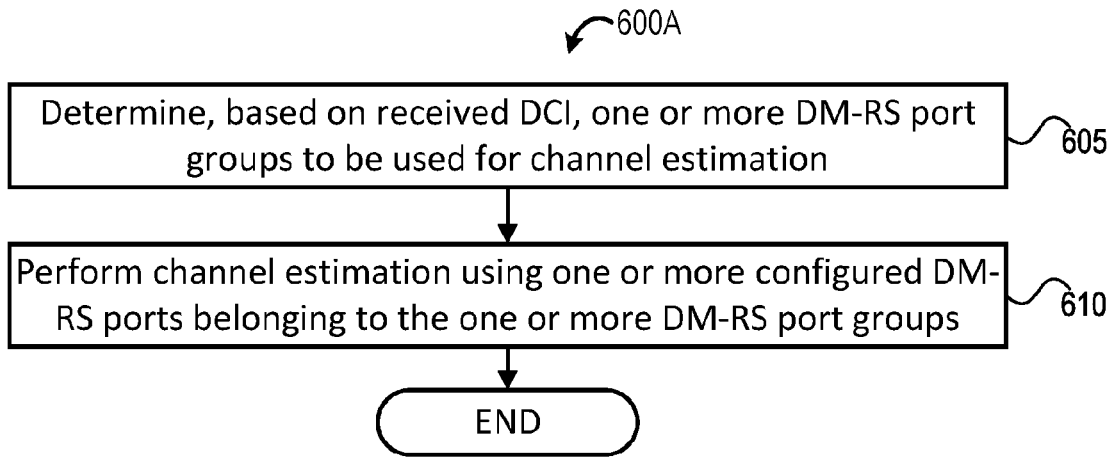
FIGS. 6A, 6B, and 7 depict example processes for practicing the various embodiments discussed herein.
Figure 6B:
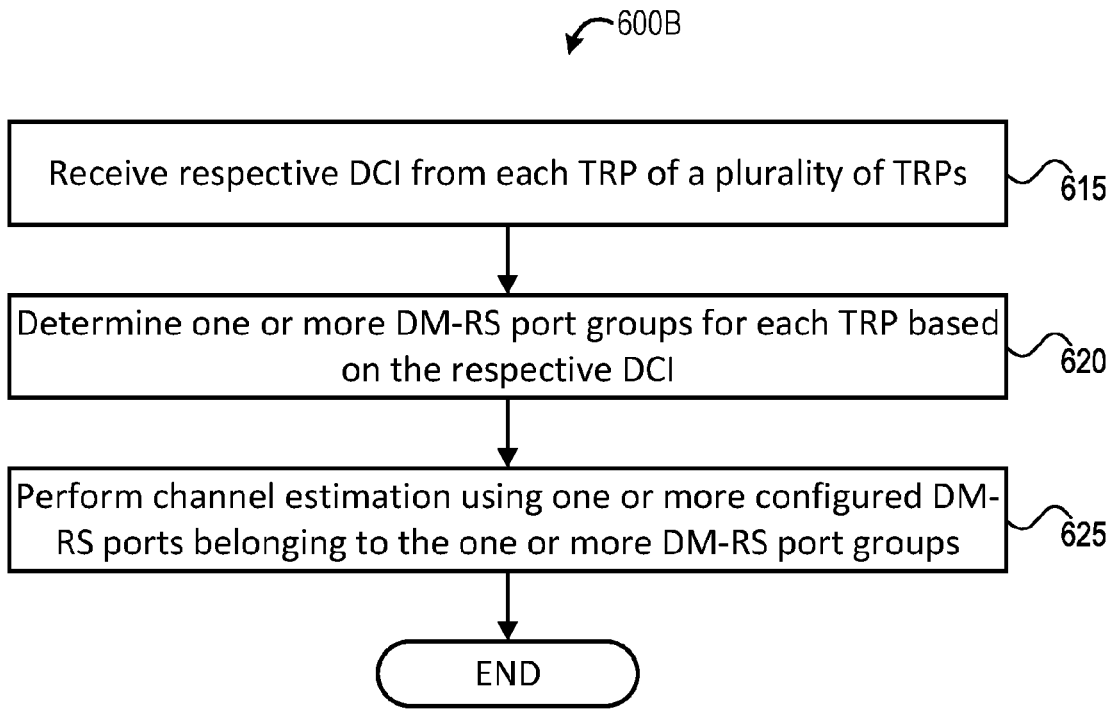
Figure 7:
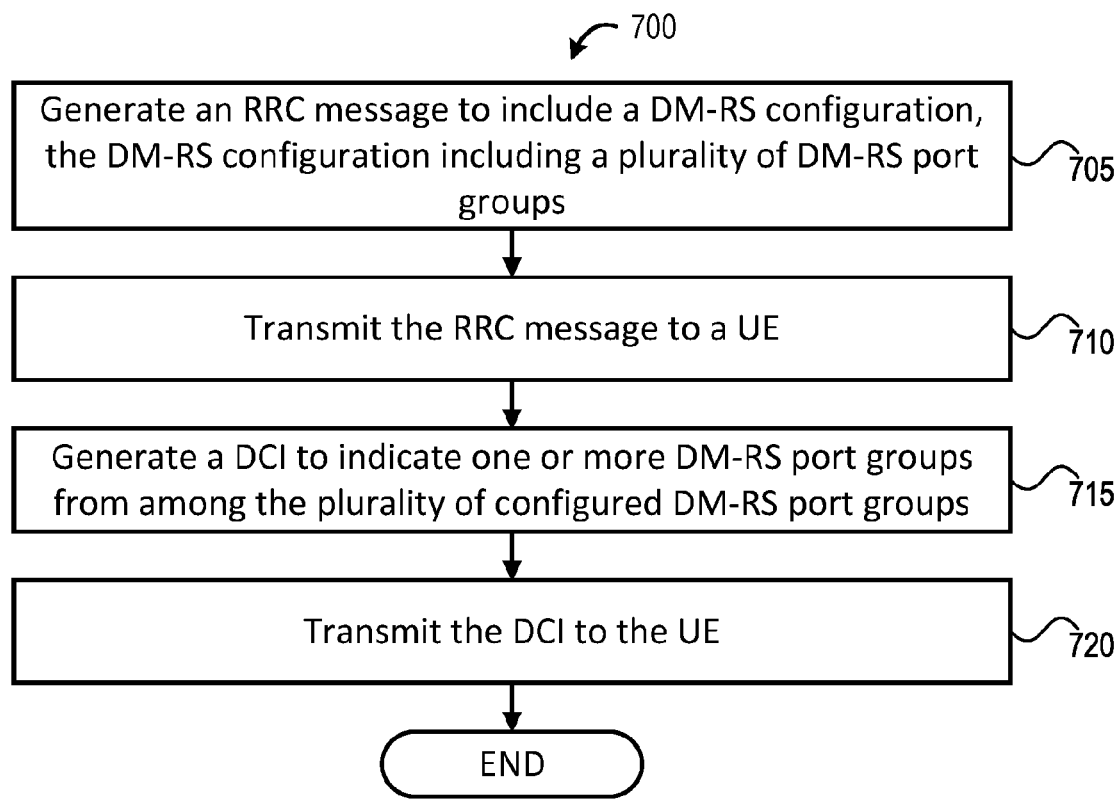

FIGS. 6A, 6B, and 7 show example procedures 600A, 600B, and 700, respectively, in accordance with various embodiments. For illustrative purposes, the various operations of processes 600A and 600B are described as being performed by a UE 101 of FIG. 1 or elements thereof, and process 700 is described as being performed by a RAN node 111 of FIG. 1. In some embodiments, the processes 600A, 600B, and 700 may be embodied as one or more computer readable storage media comprising program code, instructions, or other like a computer program product (or data to create the computer program product), which is to cause a computing device (e.g., UE 101 or RAN node 111) to perform electronic operations and/or to perform the specific sequence or flow of actions described with respect to FIGS. 6A, 6B, and 7. While particular examples and orders of operations are illustrated FIGS. 6A, 6B, and 7, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 6 shows example DM-RS configuration processes 600A and 600B according to various embodiments. Process 600A begins at operation 605 where baseband circuitry of the UE 101 determines, based on received DCI, one or more DM-RS port groups to be used for channel estimation. At operation 610, the baseband circuitry of the UE 101 performs channel estimation using one or more configured DM-RS ports belonging to the one or more DM-RS port groups. Process 600B begins at operation 615 where baseband circuitry of the UE 101 obtains respective DCI from each TRP among a plurality of TRPs via RF circuitry and interface circuitry there between. At operation 620, the baseband circuitry of the UE 101 determines one or more DM-RS port groups for each TRP based on the respective DCI received from each TRP. At operation 625, the baseband circuitry of the UE 101 performs channel estimation using one or more configured DM-RS ports belonging to respective ones of the one or more DM-RS port groups.

FIG. 7 depicts an example DM-RS configuration process 700 according to various embodiments. Process 700 begins at operation 705 where a TRP (e.g., a RAN node 111) generates an RRC message to include a DM-RS configuration, the DM-RS configuration including a plurality of DM-RS port groups. At operation 710, the TRP transmits the RRC message to the UE 101. At operation 715, the TRP generates a DCI to indicate one or more DM-RS port groups from among the plurality of configured DM-RS port groups, and at operation 720, the TRP transmits the DCI to the UE 101 to activate the one or more DM-RS port groups for channel estimation purposes.

Some non-limiting examples are as follows. The following examples pertain to further embodiments, and specifics in the examples may be used anywhere in one or more embodiments discussed previously. Any of the following examples may be combined with any other example or any embodiment discussed herein.

Example A01 includes a method comprising: determining, by baseband circuitry based on received Downlink Control Information (DCI), one or more demodulation reference signal (DM-RS) port groups to be used for channel estimation; and performing, by the baseband circuitry, channel estimation using one or more configured DM-RS ports belonging to the one or more DM-RS port groups.

Example A02 includes the method of example A01 and/or some other example(s) herein, wherein the DCI is a single DCI to schedule one or more corresponding Physical Downlink Shared Channels (PDSCHs) from multiple Transmission Reception Point (TRP) in a single DCI multiple TRP, transmission scheme.

Example A03 includes the method of example A02 and/or some other example(s) herein, wherein the one or more configured DM-RS ports belonging to a same one of the one or more DM-RS port groups belong to a same Code Division Multiplexing (CDM) group.

Example A04 includes the method of example A02 and/or some other example(s) herein, wherein the one or more configured DM-RS ports belonging to a same one of the one or more DM-RS port groups belong to different CDM groups.

Example A05 includes the method of examples A02-A04 and/or some other example(s) herein, wherein the one or more configured DM-RS ports belonging to a same one of the one or more DM-RS port groups are spatially quasi co-located.

Example A06 includes the method of examples A02-A05 and/or some other example(s) herein, wherein each DM-RS port group of a plurality of configured DM-RS port groups corresponds to an individual transmission from respective TRPs of a plurality of TRPs, the plurality of configured DM-RS port groups includes the one or more DM-RS port groups, and the method comprises: implicitly determining, by the baseband circuitry, multiple input multiple output (MIMO) layers arriving from the respective TRPs based on the DM-RS port group indicated by the DCI.

Example A07 includes the method of examples A02-A05 and/or some other example(s) herein, wherein at least two DM-RS port groups of a plurality of configured DM-RS port groups corresponds to a same TRP, the plurality of configured DM-RS port groups includes the one or more DM-RS port groups, and the method further comprises: determining, by the baseband circuitry based on the received DCI, quasi co-location (QCL) information for each of the at least two DM-RS port groups.

Example A08 includes the method of example A07 and/or some other example(s) herein, wherein the method further comprises: determining, by the baseband circuitry, the QCL information for each of the at least two DM-RS port groups based on respective a Transmission Configuration Indicator (TCI) fields in the DCI or based on a single TCI field in the DCI.

Example A09 includes the method of example A08 and/or some other example(s) herein, wherein each of the plurality of configured DM-RS port groups is associated with a different TCI state than at least one other one of the plurality of configured DM-RS port groups.

Example A10 includes the method of examples A02-A09 and/or some other example(s) herein, wherein the method further comprises: determining, by the baseband circuitry based on a received Radio Resource Control (RRC) message, a plurality of configured DM-RS port groups including the one or more DM-RS port groups, wherein the DCI is to activate usage of the one or more DM-RS port groups from among the plurality of configured DM-RS port groups.

Example A11 includes the method of example A10 and/or some other example(s) herein, wherein each DM-RS port group of the plurality of configured DM-RS port groups corresponds to an individual transmission from respective TRPs of a plurality of TRPs, and the method further comprises: determining, by the baseband circuitry, an identity of each TRP of the plurality of TRPs from which individual MIMO layers are to be provided based on the RRC message.

Example A12 includes the method of examples A10-A11 and/or some other example(s) herein, wherein each DM-RS port group of the plurality of configured DM-RS port groups is associated with a different cell identity (ID) or different scrambling ID for DM-RS pseudo-random sequence initialization.

Example A13 includes the method of examples A10-A12 and/or some other example(s) herein, wherein individual CDM Groups indicated by the RRC message are associated with different cell IDs.

Example A14 includes the method of example A01 and/or some other example(s) herein, wherein the DCI is to schedule a corresponding PDSCH transmission in a multiple DCI multiple TRP transmission scheme.

Example A15 includes the method of example A14 and/or some other example(s) herein, wherein the DCI is received over a Physical Downlink Control Channel (PDCCH) from a single TRP among multiple TRPs in the multiple DCI multiple TRP transmission scheme, the one or more DM-RS port groups correspond to the single TRP, and the PDCCH and the DCI are associated with a TCI state.

Example A16 includes the method of examples A14-A15 and/or some other example(s) herein, wherein each TRP in the multiple DCI multiple TRP transmission scheme use a same DM-RS configuration type, number of front-loaded symbols, and number and position of additional DM-RS symbols within a slot.

Example A17 includes the method of example A16 and/or some other example(s) herein, wherein each TRP in the multiple DCI multiple TRP transmission scheme further use a same DM-RS mapping type.

Example A18 includes the method of example A16 and/or some other example(s) herein, wherein a DM-RS mapping type used by each TRP in the multiple DCI multiple TRP transmission have different time domain durations, and the method further comprises: implicitly determining, by the baseband circuitry, a presence of additional DM-RS symbols from each TRP based on a scheduling of the different time domain durations.

Example A19 includes the method of example A16 and/or some other example(s) herein, wherein each TRP in the multiple DCI multiple TRP transmission scheme further use a same DM-RS configuration type and a different PDSCH mapping type, and the additional DM-RS symbols and position are different.

Example A20 includes the method of examples A14-A19 and/or some other example(s) herein, wherein the one or more configured DM-RS ports are quasi-orthogonal to one another.

Example B01 includes a method to be performed by a user equipment (UE), the method comprising: receiving respective Downlink Control Information (DCI) from each Transmission Reception Point (TRP) among a plurality of TRPs; determining one or more demodulation reference signal (DM-RS) port groups for each TRP based on the respective DCI received from each TRP; and performing channel estimation using one or more configured DM-RS ports belonging to respective ones of the one or more DM-RS port groups.

Example B02 includes the method of example B01 and/or some other example(s) herein, wherein the respective DCI received from each TRP of the plurality of TRPs is associated with a different Transmission Configuration Indicator (TCI) state.

Example B03 includes the method of examples B01-B02 and/or some other example(s) herein, wherein the respective DCI indicate a same DM-RS configuration type, a same number of front-loaded symbols, and a same number and position of additional DM-RS symbols within a slot to be used for detection of individual DM-RSs transmitted from each TRP.

Example B04 includes the method of example B03 and/or some other example(s) herein, wherein the respective DCI further indicate a same DM-RS mapping type for the individual DM-RSs.

Example B05 includes the method of examples B01-B02 and/or some other example(s) herein, wherein the DM-RS mapping type used by each TRP have different time domain durations, and the method comprises: implicitly determining a presence of additional DM-RS symbols from each TRP based on a scheduling of the different time domain durations.

Example B06 includes the method of examples B01-B02 and B05 and/or some other example(s) herein, wherein the respective DCI indicate a same DM-RS configuration type, and at least one of the respective DCI indicates a different DM-RS mapping type than other ones of the respective DCI, and at least one of the respective DCI indicates additional DM-RS symbols and position that are different than other ones of the respective DCI.

Example B07 includes the method of examples B01-B06 and/or some other example(s) herein, wherein the one or more configured DM-RS ports are quasi-orthogonal to one another.

Example C01 includes a method to be performed by a Radio Access Network (RAN) node, the method comprising: generating Downlink Control Information (DCI) to indicate one or more demodulation reference signal (DM-RS) port groups, each of the one or more DM-RS port groups including one or more configured DM-RS ports to be used for channel estimation; transmitting the DCI to a user equipment (UE); and transmitting DM-RSs in time-frequency resources according to the one or more configured DM-RS ports.

Example C02 includes the method of example C01 and/or some other example(s) herein, wherein the DCI is to schedule a corresponding Physical Downlink Shared Channel (PDSCH) transmission; and transmitting the PDSCH transmission to the UE according to the schedule indicated by the DCI.

Example C03 includes the method of example C02 and/or some other example(s) herein, wherein the one or more configured DM-RS ports belonging to a same one of the one or more DM-RS port groups belong to a same Code Division Multiplexing (CDM) group or belong to different CDM groups.

Example C04 includes the method of examples C02-C03 and/or some other example(s) herein, wherein the one or more configured DM-RS ports belonging to a same one of the one or more DM-RS port groups are spatially quasi co-located.

Example C05 includes the method of examples C02-C04 and/or some other example(s) herein, wherein each DM-RS port group of the one or more DM-RS port groups corresponds to a multiple input multiple output (MIMO) layer to be transmitted by a Transmission Reception Point (TRP) of a plurality of TRPs, and the RAN node is a TRP of the plurality of TRPs.

Example C06 includes the method of examples C02-C04 and/or some other example(s) herein, wherein the one or more DM-RS port groups corresponds to respective MIMO layers to be transmitted by a same TRP, and the method comprises: generating the DCI to include quasi co-location (QCL) information for each of the one or more DM-RS port groups, or for each of the respective MIMO layers.

Example C07 includes the method of example C06 and/or some other example(s) herein, wherein the method comprises: generating the DCI to include a Transmission Configuration Indicator (TCI) field for respective QCL information or to include a single TCI field to indicate the respective QCL information.

Example C08 includes the method of examples C02-C09 and/or some other example(s) herein, wherein the method comprises: generating a Radio Resource Control (RRC) message, to indicate a plurality of configured DM-RS port groups including the one or more DM-RS port groups; and transmitting the RRC message to the UE.

Example C09 includes the method of examples C01-C08 and/or some other example(s) herein, wherein the method comprises: generating the RRC message to indicate a cell identity (ID) for each of the one or more DM-RS port groups and a scrambling ID for DM-RS pseudo-random sequence initialization.

Example C10 includes the method of examples C01-C09 and/or some other example(s) herein, wherein individual CDM Groups indicated by the RRC message are associated with different cell IDs.

Example C11 includes the method of claims C01-C09 and/or some other example(s) herein, wherein the time-frequency resources in which the DM-RSs are to be transmitted according to the one or more configured DM-RS ports are quasi-orthogonal to one another.

Example Z01 may include an apparatus comprising means to perform one or more elements of a method described in or related to any of examples A01-A20, B01-B07, C01-C11, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A20, B01-B07, C01-C11, or any other method or process described herein.

Example Z03 may include an apparatus comprising logic, modules, or circuitry to perform one or more elements of a method described in or related to any of examples A01-A20, B01-B07, C01-C11, or any other method or process described herein.

Example Z04 may include a method, technique, or process as described in or related to any of examples A01-A20, B01-B07, C01-C11, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A20, B01-B07, C01-C11, or portions thereof.

Example Z06 may include a signal as described in or related to any of examples A01-A20, B01-B07, C01-C11, or portions or parts thereof.

Example Z07 may include a datagram, packet, frame, segment, protocol data unit (PDU), or message as described in or related to any of examples A01-A20, B01-B07, C01-C11, or portions or parts thereof, or otherwise described in the present disclosure.

Example Z08 may include a signal encoded with data as described in or related to any of examples A01-A20, B01-B07, C01-C11, or portions or parts thereof, or otherwise described in the present disclosure.

Example Z09 may include a signal encoded with a datagram, packet, frame, segment, protocol data unit (PDU), or message as described in or related to any of examples A01-A20, B01-B07, C01-C11, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A20, B01-B07, C01-C11, or portions thereof.

Example Z11 may include a computer program comprising instructions, wherein execution of the program by a processing element is to cause the processing element to carry out the method, techniques, or process as described in or related to any of examples A01-A20, B01-B07, C01-C11, or portions thereof.

Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein.

Any of the above-described examples may be combined with any other example (or combination of examples), unless explicitly stated otherwise. The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. The term "coupled" (or variants thereof) may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "communicatively coupled" may mean that two or more elements may be in contact with one another by a means of communication including through a wire or other interconnect connection, through a wireless communication channel or ink, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A user equipment, (UE), the UE comprising:
interface circuitry; and
baseband circuitry coupled with the interface circuitry, the interface circuitry to communicatively couple the baseband circuitry to radiofrequency, (RF) circuitry, the baseband circuitry to:
determine, based on Downlink Control Information (DCI) received via the RF circuitry, one or more demodulation reference signal, (DM-RS) port groups to be used for channel estimation, wherein the one or more DM-RS port groups are activated based on the DCI and selected from among a plurality of DM-RS port groups that are configured based on a DM-RS configuration transmitted to the UE using a Radio Resource Control (RRC) message; and
perform channel estimation using one or more configured and activated DM-RS ports belonging to the one or more DM-RS port groups.

2. The UE of claim 1, wherein the DCI is a single DCI to schedule one or more corresponding Physical Downlink Shared Channels, (PDSCHs) from multiple Transmission Reception Point, (TRPs) in a single DCI multiple TRP transmission scheme.

3. The UE of claim 2, wherein the one or more configured and activated DM-RS ports belonging to a same one of the one or more DM-RS port groups belong to a same Code Division Multiplexing, (CDM) group or belong to different CDM groups, wherein the one or more configured and activated DM-RS ports belonging to a same one of the one or more DM-RS port groups are spatially quasi co-located.

4. The UE of claim 3, wherein each DM-RS port group of a plurality of configured DM-RS port groups corresponds to an individual transmission from respective TRPs of a plurality of TRPs, the plurality of configured DM-RS port groups includes the one or more DM-RS port groups, and the baseband circuitry is further to:
implicitly determine multiple input multiple output, (MIMO) layers arriving from the respective TRPs based on the DM-RS port group indicated by the DCI.

5. The UE of claim 3, wherein at least two DM-RS port groups of a plurality of configured DM-RS port groups corresponds to a same TRP, the plurality of configured DM-RS port groups includes the one or more DM-RS port groups, and the baseband circuitry is further to:
determine, based on the received DCI, quasi co-location, (QCL) information for each of the at least two DM-RS port groups.

6. The UE of claim 5, wherein the baseband circuitry is further to: determine the QCL information for each of the at least two DM-RS port groups based on a respective Transmission Configuration Indicator, (TCI) fields in the DCI or based on a single TCI field in the DCI.

7. The UE of claim 6, wherein each of the plurality of configured DM-RS port groups is associated with a different TCI state than at least one other one of the plurality of configured DM-RS port groups.

8. The UE of claim 2, wherein the baseband circuitry is further to:
determine, based on the RRC message, the plurality of DM-RS port groups including the one or more DM-RS port groups.

9. The UE of claim 8, wherein each DM-RS port group of the plurality of configured DM-RS port groups corresponds to an individual transmission from respective TRPs of a plurality of TRPs, and the baseband circuitry is further to:
determine an identity of each TRP of the plurality of TRPs from which individual multiple input multiple output (MIMO) layers are to be provided based on the RRC message, wherein each DM-RS port group of the plurality of configured DM-RS port groups is associated with a different cell identity (ID) or different scrambling ID for DM-RS pseudo-random sequence initialization, and wherein individual CDM Groups indicated by the RRC message are associated with different cell IDs.

10. The UE of claim 1, wherein the DCI is to schedule a corresponding PDSCH transmission in a multiple DCI multiple TRP transmission scheme, wherein the DCI is received over a Physical Downlink Control Channel (PDCCH) from a single TRP among multiple TRPs in the multiple DCI multiple TRP transmission scheme, the one or more DM-RS port groups correspond to the single TRP, and the PDCCH and the DCI are associated with a Transmission Configuration Indicator (TCI) state.

11. The UE of claim 10, wherein each TRP in the multiple DCI multiple TRP transmission scheme use a same DM-RS configuration type, number of front-loaded symbols, and number and position of additional DM-RS symbols within a slot.

12. The UE of claim 11, wherein each TRP in the multiple DCI multiple TRP transmission scheme further use a same DM-RS mapping type.

13. The UE of claim 11, wherein a DM-RS mapping type used by each TRP in the multiple DCI multiple TRP transmission scheme have different time domain durations, and the baseband circuitry is further to:
implicitly determine a presence of additional DM-RS symbols from each TRP based on a scheduling of the different time domain durations.

14. The UE of claim 11, wherein each TRP in the multiple DCI multiple TRP transmission scheme further use a same DM-RS configuration type and a different POSCH mapping type, and the additional DM-RS symbols and position are different.

15. One or more non-transitory computer readable media, (CRM) comprising instructions, wherein execution of the instructions by one or more processors of a user equipment, (UE) cause the UE to:
receive respective Downlink Control Information, (DCI) from each Transmission Reception Point, (TRP) among a plurality of TRPs,
determine one or more demodulation reference signal, (DM-RS) port groups for each TRP based on the respective DCI received from each TRP, wherein the one or more DM-RS port groups for each TRP are activated based on the respective DCI and selected from among a plurality of DM-RS port groups that are configured based on a DM-RS configuration transmitted to the UE using a Radio Resource Control (RRC) message; and
perform channel estimation using one or more configured and activated DM-RS ports belonging to respective ones of the one or more DM-RS port groups.

16. The one or more non-transitory CRM of claim 15, wherein the respective DCI received from each TRP of the plurality of TRPs is associated with a different Transmission Configuration Indicator (TCI) state, wherein the respective DCI indicate a same DM-RS configuration type, a same number of front-loaded symbols, and a same number and position of additional DM-RS symbols within a slot to be used for detection of individual DM-RSs transmitted from each TRP.

17. The one or more non-transitory CRM of claim 16, wherein the respective DCI further indicates a same OM-RS mapping type for the individual DM-RSs.

18. The one or more non-transitory CRM of claim 16, wherein a DM-RS mapping type used by each TRP have different time domain durations, and the execution of the instructions is to cause the UE to:
implicitly determine a presence of additional DM-RS symbols from each TRP based on a scheduling of the different time domain durations, wherein the respective DCI indicate a same DM-RS configuration type, and at least one of the respective DCI indicates a different DM-RS mapping type than other ones of the respective DCI, and at least one of the respective DCI indicates additional DM-RS symbols and position that are different than other ones of the respective DCI.

19. An apparatus to be implemented in a Radio Access Network, (RAN) node, the apparatus comprising:
processor means for generating Downlink Control Information, (DCI) to indicate one or more demodulation reference signal (DM-RS) port groups, each of the one or more DM-RS port groups including one or more configured DM-RS ports to be used for channel estimation, wherein the one or more DM-RS port groups are activated based on the DCI and selected from among a plurality of DM-RS port groups that are configured based on a DM-RS configuration transmitted using a Radio Resource Control (RRC) message, and wherein the channel estimation is performed using one or more configured and activated DM-RS ports belonging to the one or more DM-RS port groups; and
radiofrequency (RF) means for transmitting the DCI to a user equipment (UE); and transmitting DM-RSs in time-frequency resources according to the one or more configured DM-RS ports, wherein the time-frequency resources in which the DM-RSs are to be transmitted according to the one or more configured DM-RS ports are orthogonal to one another or are quasi-orthogonal to one another.

20. The apparatus of claim 19, wherein the DCI is to schedule a corresponding Physical Downlink Shared Channel (PDSCH) transmission, and the RF means is for transmitting the PDSCH transmission to the UE according to the schedule indicated by the DCI.

* * * * *